(12) United States Patent
Hayse

(10) Patent No.: US 8,900,392 B2
(45) Date of Patent: Dec. 2, 2014

(54) BIAS FIBER CONTROL DURING WRAPPING OF A FABRIC PREFORM FOR A COMPOSITE COMPONENT

(75) Inventor: Steven Robert Hayse, Prospect, CT (US)

(73) Assignee: GKN Aerospace Services Structures, Corp., Cromwell, CT (US)

( * ) Notice: Subject to any disclaimer, the term of this patent is extended or adjusted under 35 U.S.C. 154(b) by 305 days.

(21) Appl. No.: 13/333,619

(22) Filed: Dec. 21, 2011

(65) Prior Publication Data

US 2013/0164492 A1    Jun. 27, 2013

(51) Int. Cl.
*B65H 81/00*    (2006.01)

(52) U.S. Cl.
USPC ........... 156/189; 156/184; 156/185; 156/190; 156/191; 156/192; 38/102.1; 38/102.91; 26/88; 26/89; 26/93

(58) Field of Classification Search
CPC .............. B65H 23/0208; B65H 23/02; B65H 23/0204; B65H 23/022; B65H 23/028
USPC .......... 156/169–175, 177, 184–195; 66/84 A, 66/84 R; 38/102.1, 102.91; 26/89, 93
See application file for complete search history.

(56) References Cited

U.S. PATENT DOCUMENTS

| | | | | |
|---|---|---|---|---|
| 3,226,273 A | * | 12/1965 | Becker | 156/195 |
| 4,677,831 A | * | 7/1987 | Wunner | 66/84 A |
| 6,827,118 B2 | * | 12/2004 | Wienands et al. | 156/393 |

FOREIGN PATENT DOCUMENTS

| | | |
|---|---|---|
| FR | 2595621 A1 | 9/1987 |
| JP | 2006326945 A | 12/2006 |
| WO | 2008145105 A2 | 12/2008 |

OTHER PUBLICATIONS

PCT International Search Report for corresponding PCT application No. PCT/US2012/070105; mailed May 20, 2013; 3 pages.

* cited by examiner

*Primary Examiner* — John Goff
*Assistant Examiner* — Carson Gross
(74) *Attorney, Agent, or Firm* — Quarles & Brady LLP

(57) ABSTRACT

A method is disclosed of directing bias tows of a fabric to be wrapped around a form to create a fabric preform. The fabric includes at least a first set of bias tows that are generally parallel with one another and a second set of bias tows that are generally parallel with one another but that are not parallel with the first set of bias tows. An edge strip is attached to ends of the first set of bias tows at a first lateral edge of the fabric relative to a feed direction of the fabric onto the form. The edge strip is moved to direct the first set of bias tows. The fabric is wrapped around the form by rotating the fabric and form relative to one another about the central axis of the form to create the fabric preform.

20 Claims, 15 Drawing Sheets

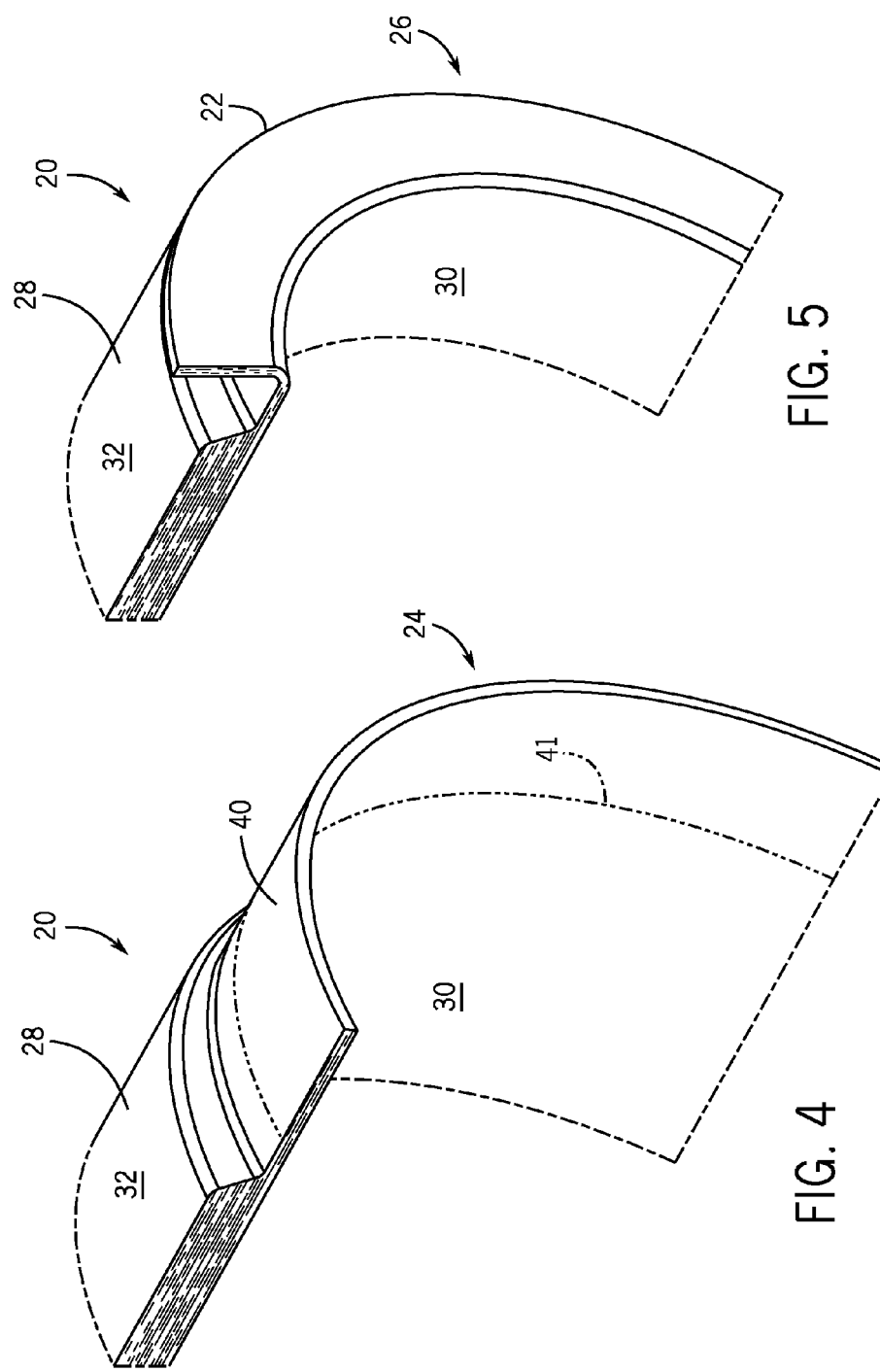

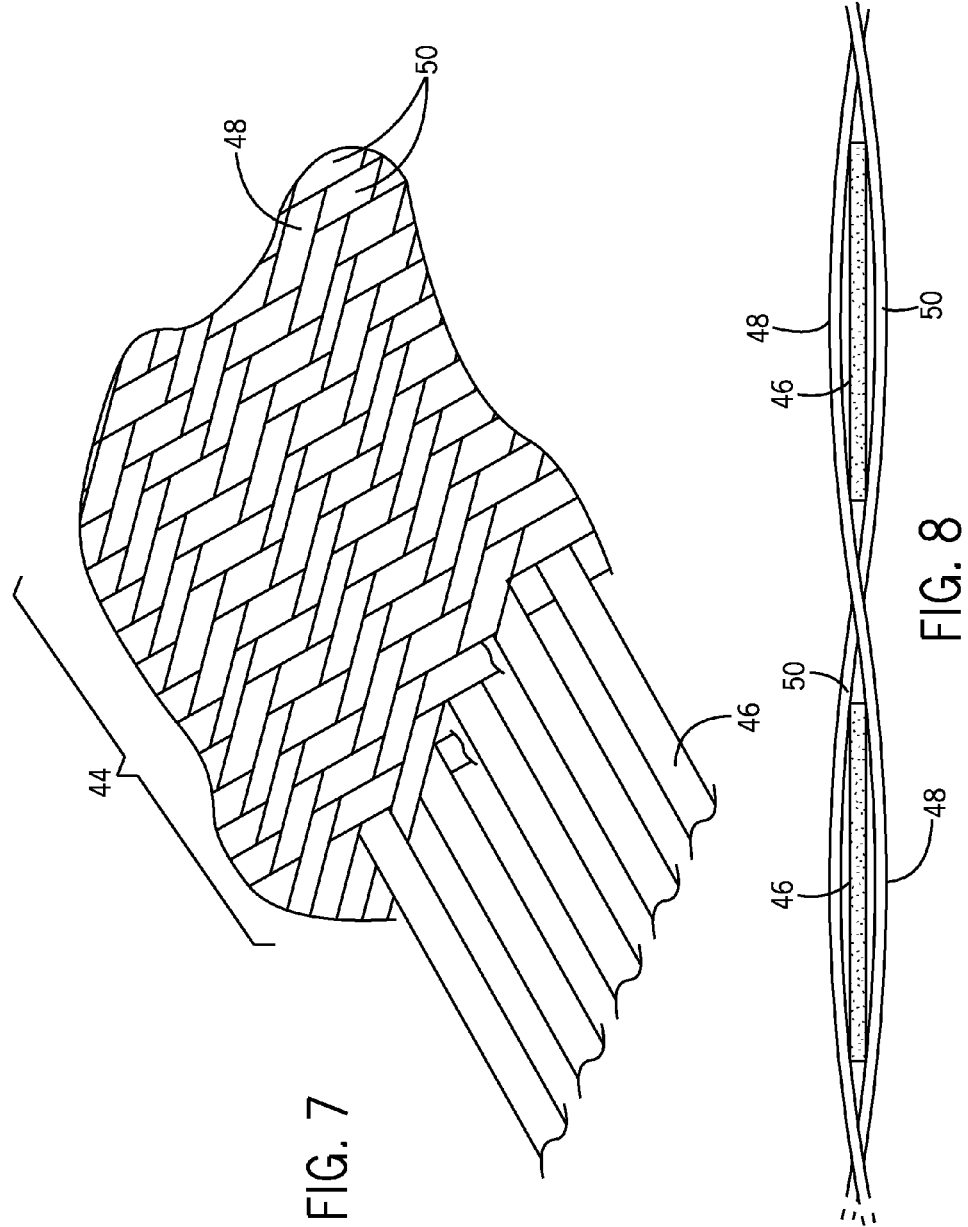

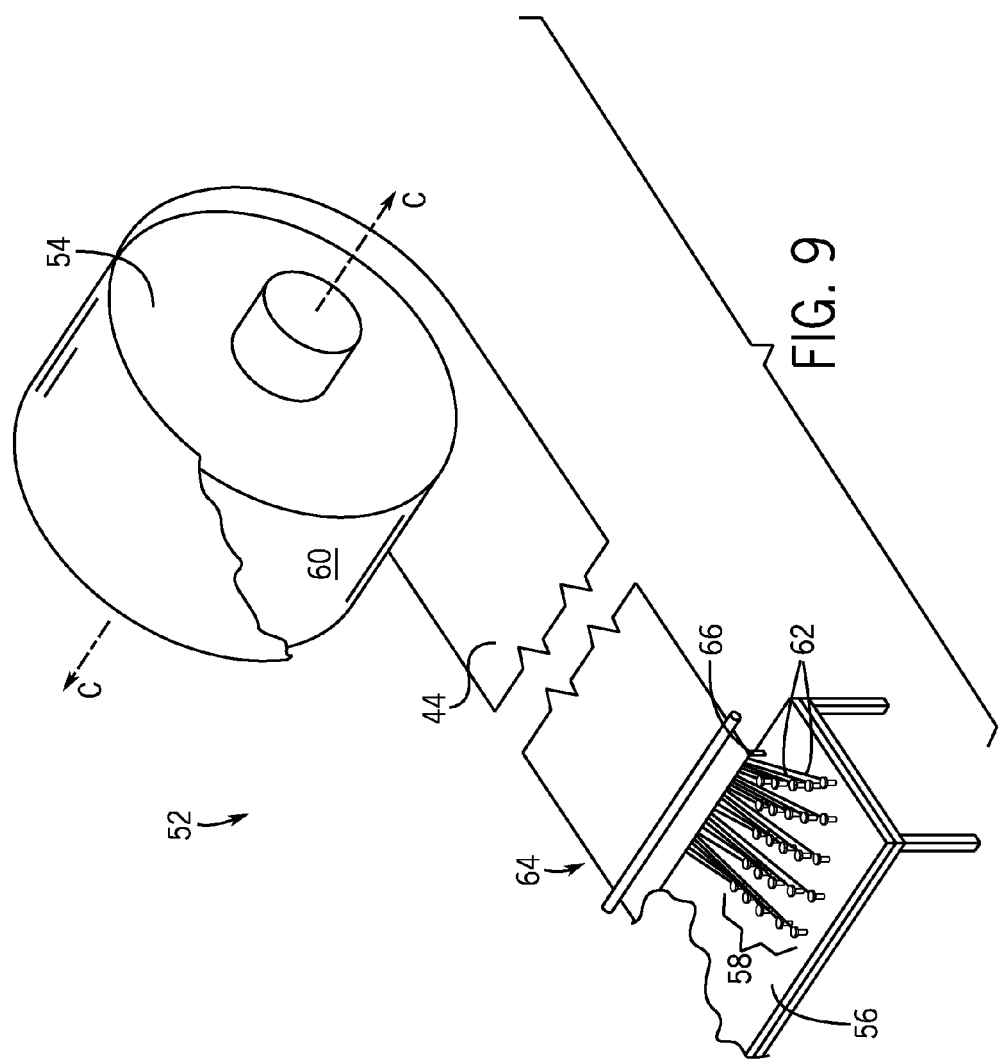

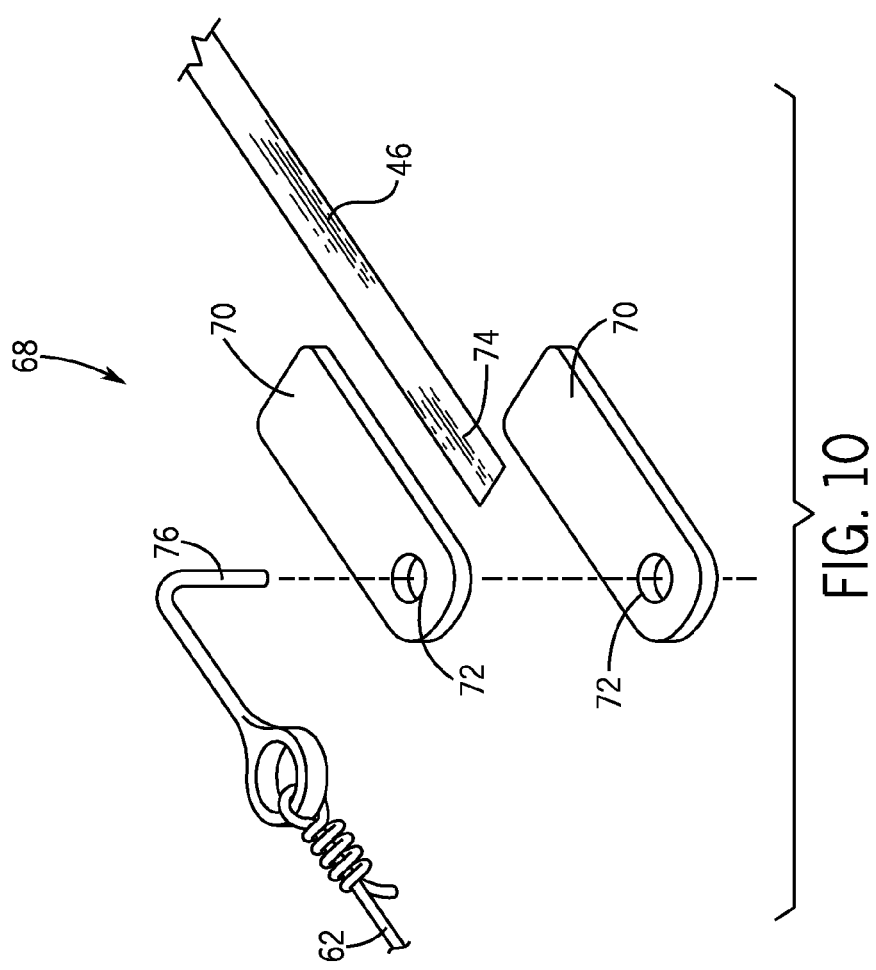

BIAS FIBER CONTROL DURING WRAPPING OF A FABRIC PREFORM FOR A COMPOSITE COMPONENT

CROSS-REFERENCE TO RELATED APPLICATIONS

Not applicable.

STATEMENT OF FEDERALLY SPONSORED RESEARCH OR DEVELOPMENT

Not applicable.

BACKGROUND

This disclosure relates to the formation of fabric preforms for composite components. In particular, this application relates to manipulation of a fabric to improve fabric preform quality.

Composite components are often used in applications in which having a high strength-to-weight ratio is important such as, for example, aircraft components. Many structural composite components can be made by wrapping a high-strength fabric around a form to create what is known as a fabric preform, applying a resin to the fabric preform, and then curing the resin to form the final composite component.

Fabrics for composite components are often provided on spools and then re-wrapped onto a form or mandrel that is cylindrical or nearly cylindrical to create the fabric preform. In some instances, the fabric, to some extent, may shift to accommodate a change in shape of the form or the fabric surrounding the form. Even for truly cylindrical forms, it is often the case that portions of the fabric are not perfectly re-wrapped onto the form and areas of wrinkling or creasing may form. However, this change is most pronounced when a relatively planar fabric is reshaped to a form having, for example, a flange or a joggle in the structure.

There remains a need for improved methods of wrapping fabric around forms to create fabric preforms, particularly those with complex shapes.

SUMMARY

Improved ways of wrapping fabric around a form to create a fabric preform are disclosed herein. Before and/or during wrapping the fabric around the preform, the ends of bias tows can be directed or moved to enable selective fabric shear. Among other things, this can be used to control the underlying architecture of the tows of the fabric in such a way as to impart improved structural consistency and mechanical properties in the fabric preform.

A method is disclosed of directing bias tows of a fabric to be wrapped around a form to create a fabric preform. The fabric includes at least a first set of bias tows that are generally parallel with one another and a second set of bias tows that are generally parallel with one another, but that are not parallel with the first set of bias tows. An edge strip is attached to ends of the first set of bias tows at a first lateral edge of the fabric relative to a feed direction of the fabric onto the form. The edge strip is moved to direct the first set of bias tows. The fabric is wrapped around the form by rotating the fabric and form relative to one another about the central axis of the form to create the fabric preform.

Additionally, an edge strip may be attached to ends of the first set of bias tows at a second lateral edge of the fabric in which the second lateral edge is opposite the first lateral edge. Both of the edge strips attached to the ends of the first set of bias tows may be moved to direct the first set of bias tows. The edge strip attached to the ends of the first set of bias tows on the first lateral edge may be advanced relative to the feed direction of the fabric and the edge strip attached to the ends of the first set of bias tows on the second lateral edge of the fabric may be retarded relative to the feed direction of the fabric.

In some forms of the method, an edge strip may be attached to ends of the second set of bias tows at the first lateral edge of the fabric. The edge strip attached to ends of the second set of bias tows may be moved to direct the second set of bias tows. According to one movement arrangement, the edge strip attached to the ends of the first set of bias tows on the first lateral edge may be advanced relative to the feed direction of the fabric and the edge strip attached to the ends of the second set of bias tows on the first lateral edge of the fabric may be retarded relative to the feed direction of the fabric.

According to some forms of the method, four edge strips may be attached to ends of the first set of bias tows on the first and second lateral edges of the fabric and to the ends of the second set of bias tows on the first and second lateral edges of the fabric, respectively. The four edge strips may be controlled independently of one another and the first set of bias tows may be controlled independently of the second set of bias tows by the four edge strips. One of the edge strips attached to each of the first set of bias tows and the second set of bias tows may be advanced relative to the feed direction of the fabric while the other of the edge strips attached to each of the first set of bias tows and the second set of bias tows may be retarded relative to the feed direction of the fabric. This action or movement of the four edge strips can induce shear in the fabric. Advancing and retarding the edge strips relative to the fabric controls the orientation of the respectively attached set of tows and changes the angle between the first set of bias tows and the second set of bias tows. Moreover, at least some of the edge strips may be pulled laterally outward to place the fabric in lateral tension that is generally perpendicular to a feed direction of the fabric.

To assist in shaping the fabric being laid down on the form, the step of wrapping may occur contemporaneously with the step of moving the edge strip to direct the first set of bias tows.

By moving the edge strip to direct the first set of bias tows, a shear may be induced in the fabric so as to facilitate formation of a feature on the fabric preform. The feature formed on the fabric preform may extend, at least in part, in a radial direction relative to the central axis of the fabric preform.

A tension may be applied to at least some of the bias tows that induces a stress in the fabric. This induced stress may be locked into the fabric when the fabric is wrapped around the form and further locked in when the fabric preform is injected with resin.

The fabric may be pulled onto the form along a feed direction (or a machine direction) that is generally perpendicular to a rotational axis of the form.

The fabric used in the disclosed method may be any of a number of types of fabrics. For example, the fabric may be a tri-axial fabric comprising a plurality of axial tows and two sets of bi-axial tows. In this arrangement, one of the two sets of bi-axial tows constitutes the first set of bias tows and the other of the two sets of bi-axial tows constitutes the second set of bias tows. As another example, the fabric may be a biaxial fabric comprising the first set of bias tows and the second set of bias tows. In still another example, the fabric may be a bias woven fabric. The tows of the fabric may comprise carbon-fiber material, which is lightweight and has excellent strength.

By directing the bias tows, at least some of the tows may be steered for performance purposes. For example, tows (either the bias tows or hoop tows that are scissored by the bias tows) may be placed to have a beneficial impact on the structural and mechanical qualities of the final composite component. For example, if the fabric used to form the fabric preform is a tri-axial fabric, when the bias tows are directed to induce some amount of fabric shear, then it may be the case that differential spacing of axial tows results.

A fabric preform and composite component are also disclosed that are made by the methods described herein. In the case of the composite component, resin is further applied to the fabric preform to form the composite component.

When the fabric used to form the fabric preform is a tri-axial fabric and the bias tows are directed to induce some amount of fabric shear, then differential spacing of axial tows may occur in the preform.

In some forms of the fabric preform, the fabric preform may include a first volume in which the first and second set of bias tows are disposed at a first angle relative to one another and a second volume in which the first and second set of bias tows are disposed at a second angle relative to one another in which the first angle is different than the second angle.

In some forms of the fabric preform, the bias tows may be under an induced stress by alteration of their orientation in comparison to a relaxed fabric. This induced stress can lock into the fabric preform during wrapping to maintain the orientation of the bias tows and be further locked in during the application of resin.

These and still other advantages of the invention will be apparent from the detailed description and drawings. What follows is merely a description of some preferred embodiments of the present invention. To assess the full scope of the invention the claims should be looked to as these preferred embodiments are not intended to be the only embodiments within the scope of the claims.

BRIEF DESCRIPTION OF THE DRAWINGS

FIG. 4 is a partial view of the fabric preform of FIG. 2 with a cross section taken there through;

FIG. 5 is a partial view of the fan containment case or fan case of FIG. 3 with a cross section taken there through;

FIG. 7 is a detailed view of a segment of tri-axial fabric in which the axial or hoop tows extend from the end of the fabric;

FIG. 8 is a cross-sectional side view of the tri-axial fabric;

FIG. 9 is an illustration of a schematic for an apparatus used to form a fabric preform while separately tensioning each of the axial tows;

FIG. 10 is one embodiment of an intermediate connector that may be used to connect an axial tow to a tensioning mechanism;

DETAILED DESCRIPTION

This disclosure is directed at improved methods of producing fabric preforms that can be further processed to make composite components or parts. Typically, once the fabric preform is wrapped, resin can be introduced into the fabric preform to form a composite component. This resin could be provided in any of a number of ways including, but not limited to, injection molding and transfer molding such as resin transfer molding (RTM) and vacuum-assisted resin transfer molding (VARTM). After curing the resin, the high-strength fibers of the fabric are held in place within the resin matrix to provide the composite material.

In this detailed description, some specific embodiments of fabric preforms and composite components are provided in which composite components for aircraft are described. However, the illustrated preforms and components should not be construed as the only preforms and components to which the recited methods are applicable. The methods described herein might also be used to make non-aircraft composite components, as well as any other process in which fabric is wrapped around a form to create a fabric preform.

Figure 1:
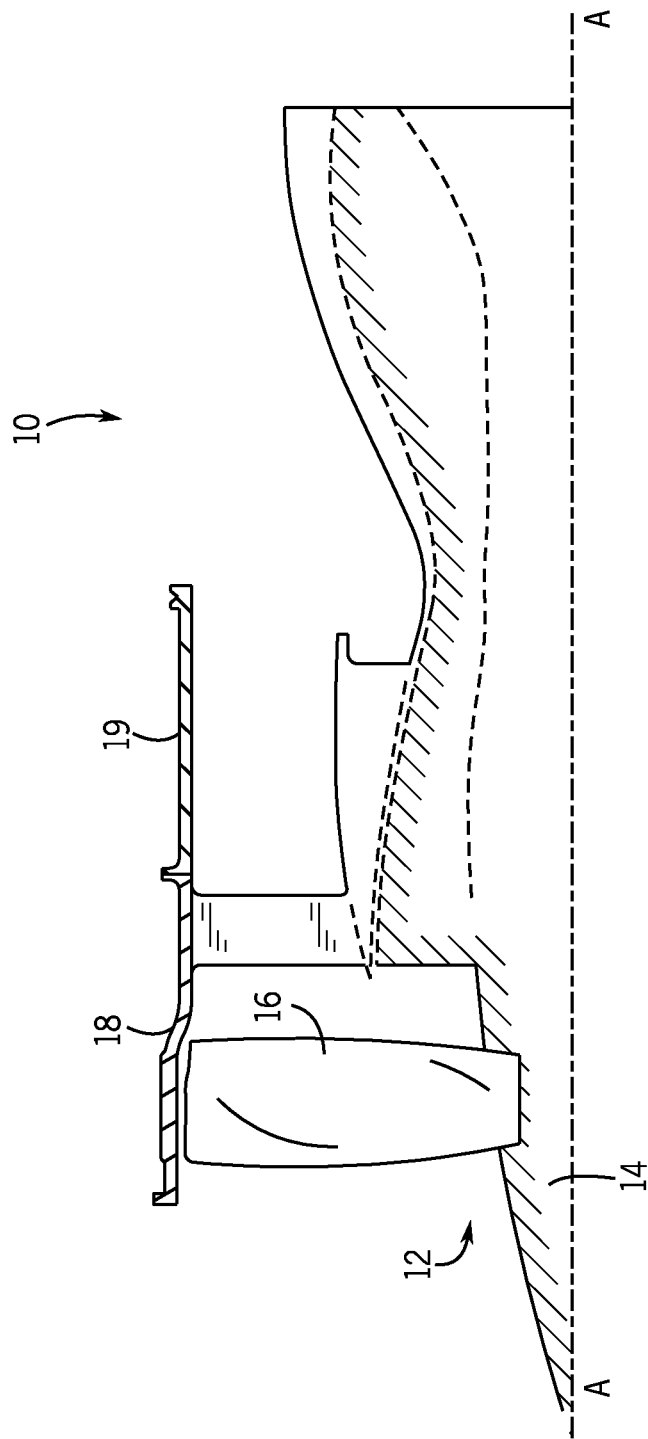
FIG. 1 is a partial cross-sectional side view of a turbofan engine including a fan containment case and a fan case.

Referring first to FIG. 1, a portion of a turbofan engine 10 for an aircraft is illustrated. This turbofan engine 10 includes a fan assembly 12 that is rotatable about a central axis A-A of the turbofan engine 10 to intake air and, ultimately, produce propulsion. The fan assembly 12 has a central rotor 14 that extends along the central axis A-A and includes a plurality of blades 16 that extend generally radially outward from the central rotor 14.

This fan assembly 12 is surrounded, at least in part, by a fan containment case 18. This fan containment case 18 is made of a high-strength composite material such as a fabric encased in a resin. For aircraft components, the fabric may be made of a carbon fiber material and the resin may be an epoxy or a high-temperature resin such as bismaleimide or polyamide to make an extremely strong and rigid component that is stable at high temperatures. However, other fabrics and resin material might be used depending on the demands of the application. Some of the materials that may be used to construct composite materials will be discussed in further detail below.

The fan containment case 18 helps to prevent any projectiles from radially exiting the turbofan engine 10 in a direction that could damage the engine 10 or the aircraft. For example, if one of the blades 16 of the fan assembly 12 fails in a "blade out" event in which some or all of a blade 16 breaks from the central rotor 14, then the fan containment case 18 helps to contain the fractured portion of the blade 16. Likewise, if an outside object is sucked into the turbo engine 10 during gas intake, then the fan containment case 18 can prevent a potentially catastrophic event from occurring if this item is shot radially outward after it contacts the blade 16.

FIG. 1 also shows a fan case 19 attached behind the fan containment case 18. This fan case 19 can be made of similar materials to the fan containment case 18 and continues the duct within which the engine bypass air flows.

Turning now to FIGS. 2 through 5, a fabric preform 20 for a fan containment case 18 having an axis B-B is illustrated before and after flanges 22 are formed on the axial ends 24 and 26. The fabric preform 20 has a generally tubular body 28 extending between the two axial ends 24 and 26. The body 28 includes a radially-inward facing surface 30 that contacts a form or mandrel during formation and a radially-outward facing surface 32. In the particular embodiment shown, the body 28 includes a joggle or a portion of curvature 34 that separates the body 28 of the fan containment case 18 into two sections 36 and 38 of different diameter or radius. These sections 36 and 38 of differing diameters can help to accommodate a particular position of the blades 16 (as seen, for example, in FIG. 1) and may also serve to direct the air flow through the turbofan engine 10. This joggle or portion of curvature 34 conceptually is a feature of the body 28 that extends, at least in part, in the radial direction.

Figure 2:
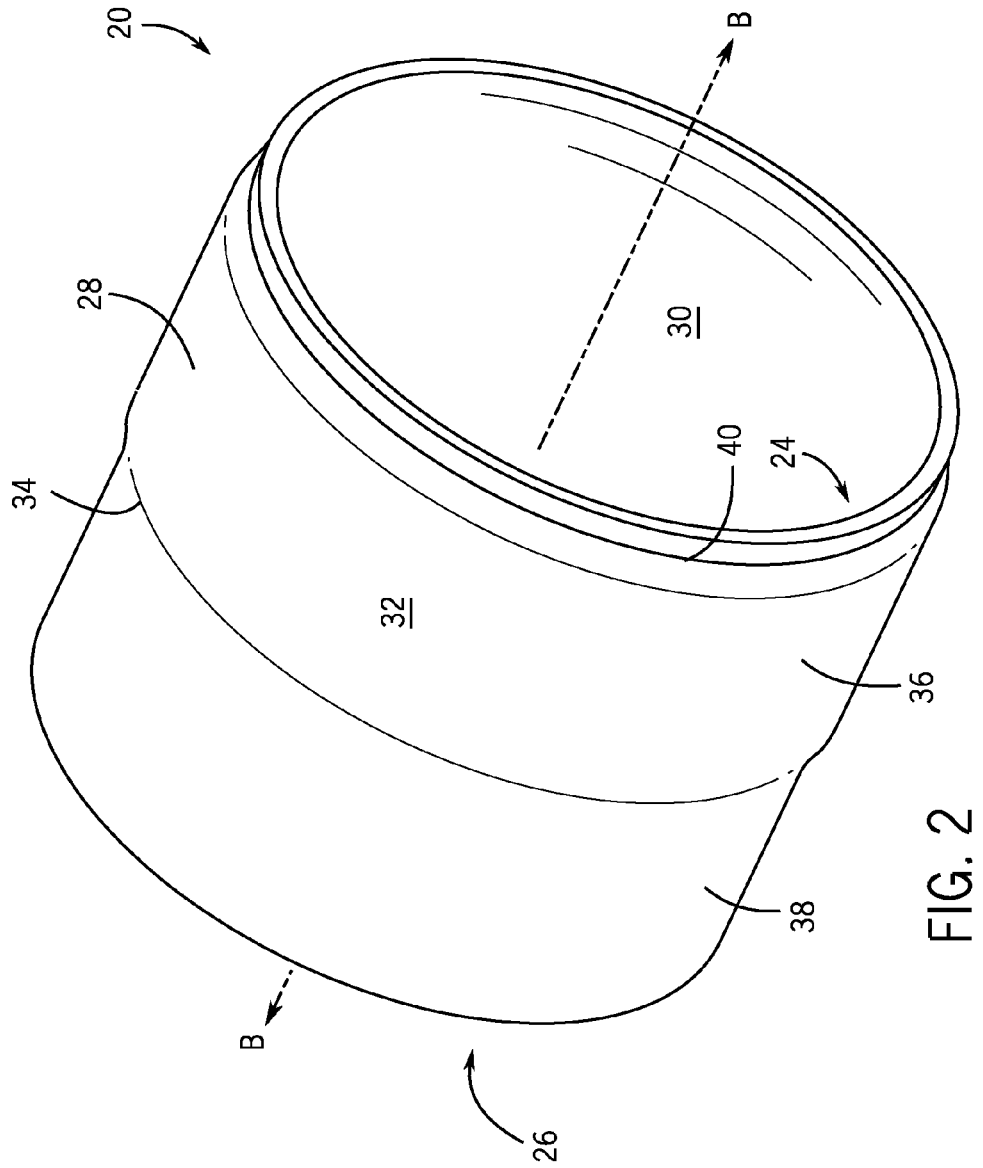
FIG. 2 is one embodiment of a fabric preform for a fan containment case or fan case.
Figure 3:
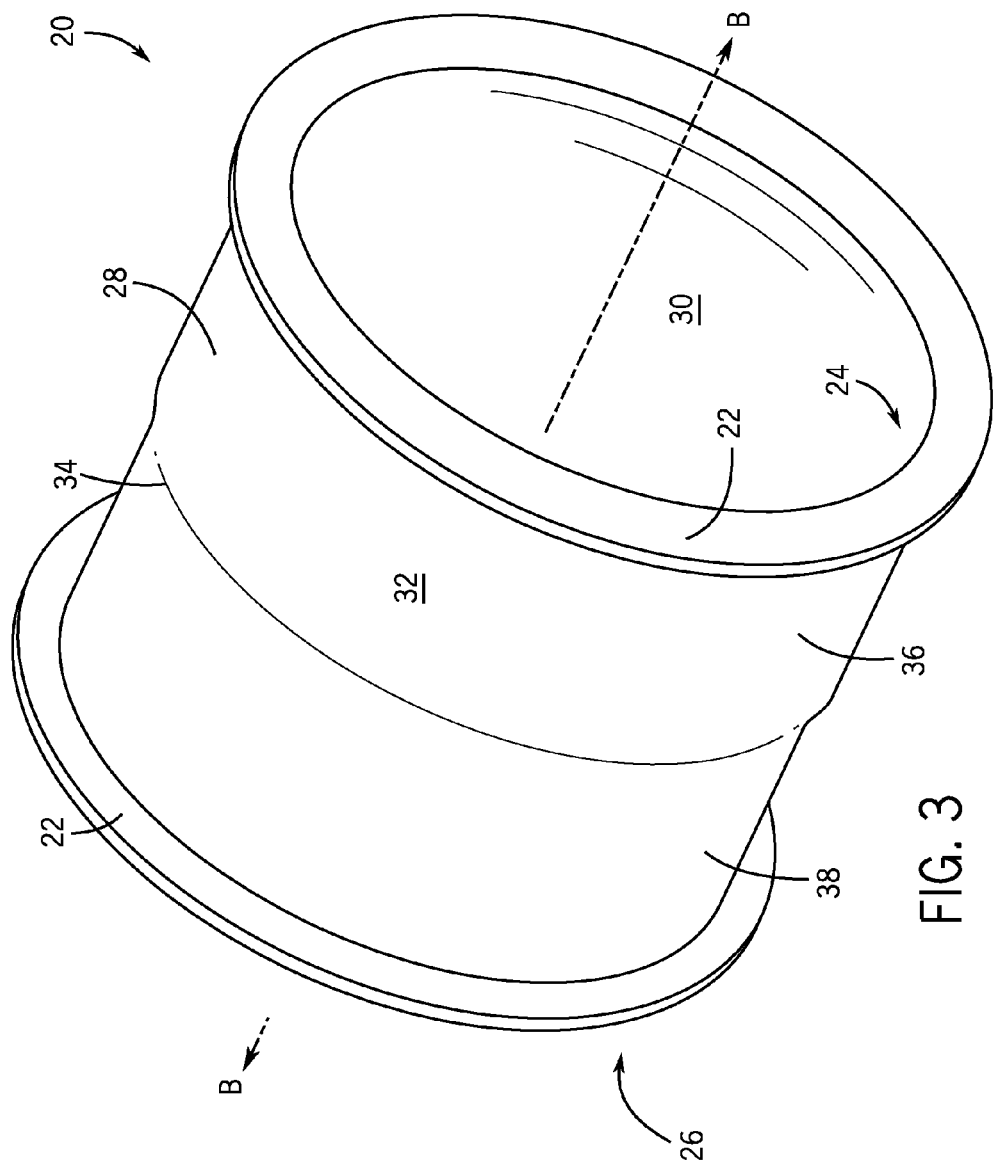
FIG. 3 is a fan containment case or fan case similar to FIG. 2, but after flanges have been formed at the axial ends of the generally tubular body.

As best seen in FIGS. 2 and 4, the fabric preform 20 for the fan containment case 18 may be formed such that the axial ends 24 and 26 are thinner than the remainder of the generally tubular body 28 to define precursor flange regions 40 on the axial ends 24 and 26. Before the introduction of the resin, these precursor flange regions 40 might be bent upward at the line 41 on FIG. 4 to form the flanges 22 that are used to attach the fan containment case 18 to adjacent components in the final assembly. It is likewise possible that these precursor flange regions 40 might be bent downward at the line 41 on FIG. 4 to form the flanges 22. However, it is also contemplated that by employing the fabric manipulation techniques below, that the flanges 22 might be formed concurrently with the wrapping of the fabric. It is likewise possible to conceive of a design that has only one flange at either end 24 or 26, or no flanges at all.

The fabric preform 20 for the fan containment case 18 includes multiple wrapped layers of fabric. The thickness of the fan containment case 18 is dictated in part by the number of layers of fabric and the thickness of the fabric. However, the quality of the wrapping and bulkiness of the fabric will also affect the thickness of the fabric preform 20 and the resultant composite component. For example, a fabric preform that is thoroughly debulked will typically have an average thickness that is less than a fabric preform that is not thoroughly debulked because imperfections in the wrapping of the fabric can create irregular regions.

Figure 6:
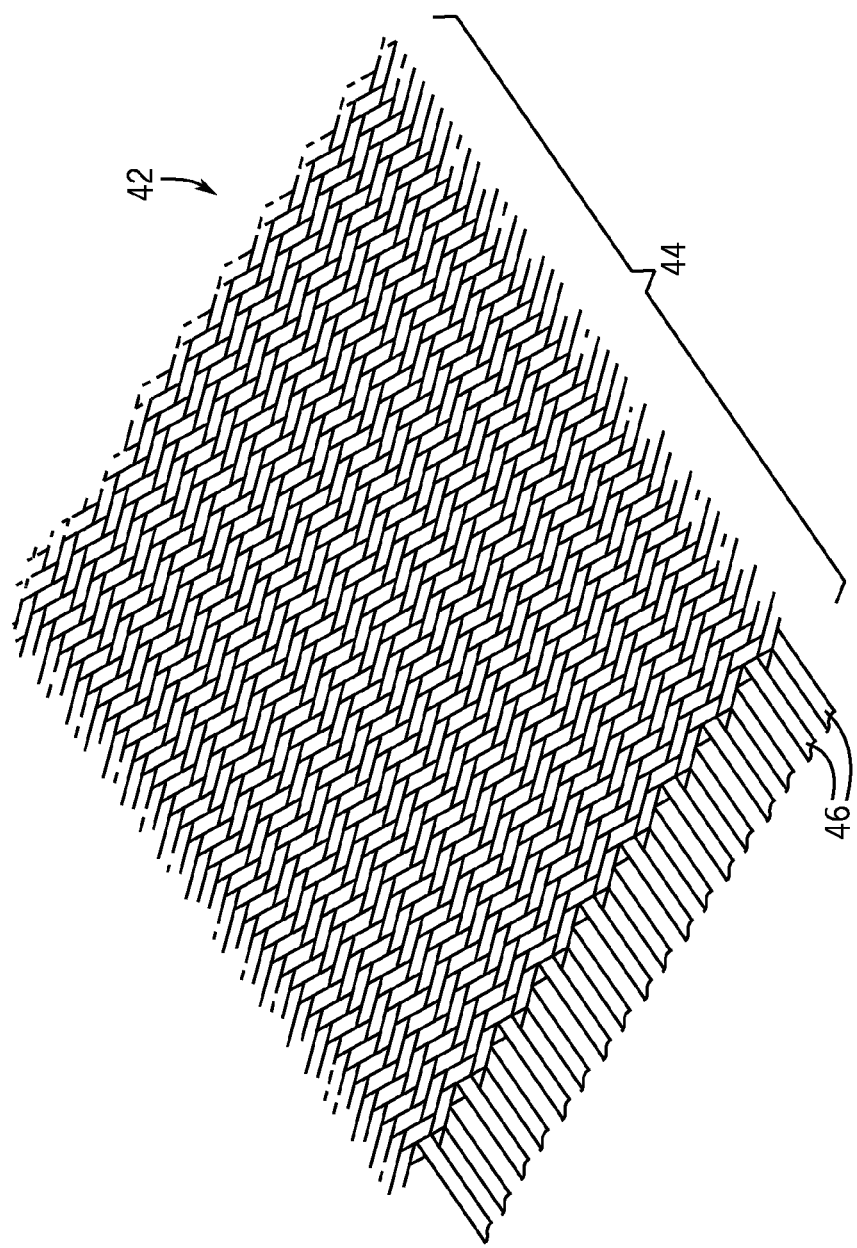
FIG. 6 illustrates a tri-axial fabric material that can be used to fabricate fabric preforms and composite components.

To provide some understanding of the fiber structure of the fabric preform 20 in the fan containment case 18, a description of one preferred fabric for forming the fabric preform 20 is now described in greater detail with additional reference to FIGS. 6 through 8. In FIGS. 6 through 8, a tri-axial fabric 42 is shown as including various tows of the fabric material which are braided together to form a fabric sheet 44. The tri-axial fabric 42 includes a plurality of hoop or axial tows 46 and a plurality of bi-axial tows 48 and 50.

As used herein, tows refer to a bundle of fibers or filaments so arranged as to form a continuous length of material. Typically, for aircraft composite structures, such tows are made of carbon fibers or graphite, which have excellent strength for their weight.

The hoop or axial tows 46 are arranged to be generally parallel with one another. For the sake of clarity, these tows 46 extend in a direction that is generally parallel with the direction of travel of the fabric sheet 44 as the fabric sheet 44 is wrapped around a form or mandrel. Therefore, in the context of the fabric feeding or wrapping, these tows may be said to be axial. Because these tows 46 are then wrapped about a central axis of the form or mandrel, these tows 46 may also be referred to as "hoop tows" because they extend around the form in the hoop direction once the fabric 44 is laid onto the form.

The plurality of bi-axial tows 48 and 50 include two sets of tows that are oriented at a positive angle from the axial tows 46 and at a negative angle from the axial tows 46, respectively. The bi-axial tows 48 and 50 are alternatively passed over and under axial tows 46 to form the fabric sheet 44 as is best illustrated in FIG. 8 so as to form a braid in the fabric sheet. This means that the axial tows 46 extend roughly linearly through the fabric sheet 44. When the fabric sheet 44 is laid flat, each of the sets of bi-axial tows 48 and 50 are generally parallel with one another (i.e., the various tows in the first set of bi-axial tows 48 are parallel with one another and the various tows in the second set of bi-axial tows 50 are parallel with one another).

Although a tri-axial fabric has been described and provides the base material for the production of the fabric preform 20 illustrated in the example composite component of a fan containment case 18, it is contemplated that other types of fabric might be used with some of the methods described herein. Accordingly, it should be understood that other types of fabric might be used, although some techniques may be inherently limited by the characteristics of the fabric. For example, the separate and independent tensioning of hoop tows might not be readily practiced if the fabric does not contain axial tows.

Returning now to FIGS. 2 through 5 and more specifically with reference to FIGS. 4 and 5, multiple layers of the tri-axial fabric 42 are wrapped upon one another to create the fabric preform 20. The tri-axial fabric 42 is disposed in the fabric preform 20 such that the axial tows 46 extend along the hoop direction of the fabric preform 20 and are generally perpendicular to the axis B-B, while the bi-axial tows 48 and 58 are generally helically disposed around the generally tubular body 28.

Generally, to form the fabric preform 20, one end of the fabric 44 is received on the form such that the axial tows of the fabric extend in a direction generally perpendicular to the central axis of the form. The fabric 44 is then wrapped about the form, normally by the rotation of the form pulling the fabric 44 onto the form, to lay down the layers of the fabric 44 (although it is possible that the free end of the fabric may be orbited around the form either while the form is held stationary or while the form also rotates). During this wrapping, the fabric 44 might be periodically debulked or could be continuously debulked using the apparatus and process described below.

To form the comparably thinner sections of the precursor flange regions 40, the fabric 42 might be cut prior to being laid on the form. In this way, fewer layers of the tri-axial fabric 42 are laid down on the axial ends of the form.

Now, various improvements to the wrapping process will be described that can help to provide a fabric preform with a fiber architecture that promotes the formation of a strong composite component. The described methods provide for better control of the fabric during the wrapping process and for improved continuous debulking of the preform as it is wrapped. This means that the resultant fabric preform is more tightly wrapped, has less bulk than preforms made using conventional wrapping, and has fewer wrinkles and waviness in the as-wrapped fabric preform. When the composite component is formed by application of resin to the preform, the final composite component has a higher fabric-to-resin volume ratio (also known as fiber volume ratio or fiber fraction) density which improves the strength to weight ratio of the composite and provides a more consistent fiber structure within the composite component.

Turning to FIG. 9, an apparatus 52 is shown that can be used to wrap the fabric 44 around a form 54 while simultaneously tensioning each of the axial or hoop tows 46 separately and independently from each other. The apparatus 52 includes the form 54 having a central or rotational axis C-C and a table 56 spaced from the form 54 that supports a plurality of separate tensioning mechanisms 58.

In the embodiment illustrated, the form 54 is a rotatable mandrel that receives one end of the fabric 44 there on. The reception of the end of fabric 44 could be made in any of a number of ways including, for example, attachment of one end of the fabric 44 to the form 54 by taping, adhesive, fasteners, clamping, or so forth. The fabric 44 could also be received on the form 54 by wrapping the fabric 44 around the form 54 at least one full rotation and then holding the fabric 44 taut such that the tension of the fabric 44 wrapped over itself holds the fabric 44 on the form 54.

As shown, the form 54 has a cylindrical shape (i.e., having a constant radius over the axial length of the form 54 onto which the fabric is wrapped thereby defining an outwardly-facing cylindrical surface 60 centered about the axis C-C). However, in other embodiments, the form 54 could have a different shape. For example, the form could have a square or rectangular cross section which would result in a tubular rectangular shape for the fabric preform. In another example, the form could have a radius that varies over at least a portion of the axial length of the form. This variable radius could be used to form a joggle or a like, such as is found on the fan containment case 18 depicted in FIG. 1.

Looking at the other half of the apparatus 52, the tensioning mechanisms 58 are fanned out or spread out across the table 56. Each of the tensioning mechanisms 58 have a line 62 that feeds out there from. These lines 62 are each coupled to one of the axial tows 46 on a free end 64 of the fabric 44 (that is, the end of the fabric 44 opposite to the end of the fabric 44 that is initially wrapped around or received on the form 54 such that the axial tows 46 extend from one end to the other). The lines 62 from the tensioning mechanisms 58 are fed through a guide or comb 66 such that the each of the lines 62 are generally collinear with a corresponding axial tow 46 to which a line 62 is coupled. In this way, each of the tensioning mechanisms 58, which are considerably larger than the size of the axial tows 46, can be spaced apart from one another on the table 56 and provide ample clearance for the running of the lines 62.

In the illustrated embodiment of FIG. 9, each of the tensioning mechanisms 58 is a magnetic clutch. Each of the magnetic clutches have a spool that feeds the line 62 out there from. During this feed out of the line 62, the magnetic clutch provides controlled resistance against the rotation of the spool as the line 62 is pulled or unwound from the spool. Because each line 62 is attached to an axial tow 46, as will be described in greater detail below, each of the axial tows 46 are separately and independently tensioned and paid out.

As used herein, for an axial tow to be "separately tensioned" means that the axial tow is tensioned apart from at least some of the other axial tows in the fabric. In one preferred embodiment, each and every one of the axial tows of the fabric are separately tensioned from one another. This separate tensioning can result in one or more of the axial tows 46 slipping within the bi-axial tows 48 and 50 of the fabric 44. However, in other forms the separate tensioning of the axial tows may be performed in groups. For example, two or more axial tows might be tensioned apart from the other tows. This may be beneficial to minimize the size and/or cost of the apparatus. Individually paid out means that the tows can be paid out in different lengths. One tow may be fed at a different rate than another tow, at least for a period of time.

Returning now to the illustrated embodiment of the apparatus 52 in FIG. 9, although the individual axial tows 46 are separately tensioned, this does not necessarily mean that each of the axial tows 46 receives a different tension. In fact, the tensioning mechanisms 58 may be set to provide the same tension or substantially the same tension to each of the axial tows 46. Due to either differences in the fabric 44 itself, or in the shape of the form 54 over its axial length, separately maintaining a constant axial tension over the various axial tows 46 can result in a differential pay out of the axial tows 46 in the fabric 44. In contrast, if the fabric 44 was clamped across its entire width, then the clamping force would inhibit the movement or individual pay out of the axial tows 46 of the fabric 46 relative to one another.

The ability for the axial tows 46 to pay out differentially can be used to improve the quality and consistency of the fabric preform 20. Whereas a singularly tensioned fabric needs to be very carefully aligned with respect to the form to prevent uneven wrapping of the fabric, the disclosed apparatus 52 is more forgiving and greater misalignment can be accommodated. Additionally, because the axial tows 46 can slip relative to one another, a form having different cross sections over its width might be better accommodated because the axial tows 46 being wrapped around a portion of the form having a shorter periphery can pay out more than the axial tows 46 being wrapped around a portion of the form having a longer periphery. This might be the case for a form that is used to produce the fabric preform 20 for the fan containment case 18 that is illustrated in FIGS. 1 through 5.

It is contemplated that the lines 62 from the tensioning mechanisms 58 might be directly connected to the axial tows 46 or that the axial tows 46 might be connected to the lines 62 via an intermediate connector. When an intermediate connector is used, the intermediate connector may attach to both the line 62 and to the axial tow 46. By using some kind of linkage, the connection of the intermediate connector to the corresponding line 62 can be made in such a manner as to preserve the integrity of the line 62. While a direct connection might involve knotting or adherence of the line to the axial tow and can be difficult to reverse without sacrificing some length of the line, an intermediate connector could be used to reversibly connect an axial tow 46 to a line 62.

One type of intermediate connector 68 is partially illustrated in FIG. 10. This intermediate connector 68 includes a pair of pads 70 with apertures 72. The pads 70 can be disposed on either side of an end 74 of an axial tow 46 and then put together to sandwich the end 74 of the axial tow 46 there between. In some forms, the pads 70 could be used in conjunction with adhesive to attach to the axial tow 46. In other forms, one or more of the pads 70 might be magnetically attracted toward one another. In still other forms, a mechanical pressure might be applied to the pads 70 such that they pinch the end 74 of the axial tow 46. A hook 76 tied to the end of the line 62 can then be directed through the aperture 72 in the pads 70 to temporarily link the pads 70 to the lines 62 of the tensioning mechanisms 58.

Because the fabric is more densely wrapped than in a fabric preform not formed by separately tensioning at least some of the plurality of axial tows, a higher fabric-to-resin volumetric ratio can be realized in the composite component formed after resin is applied to the fabric preform.

Figure 11:
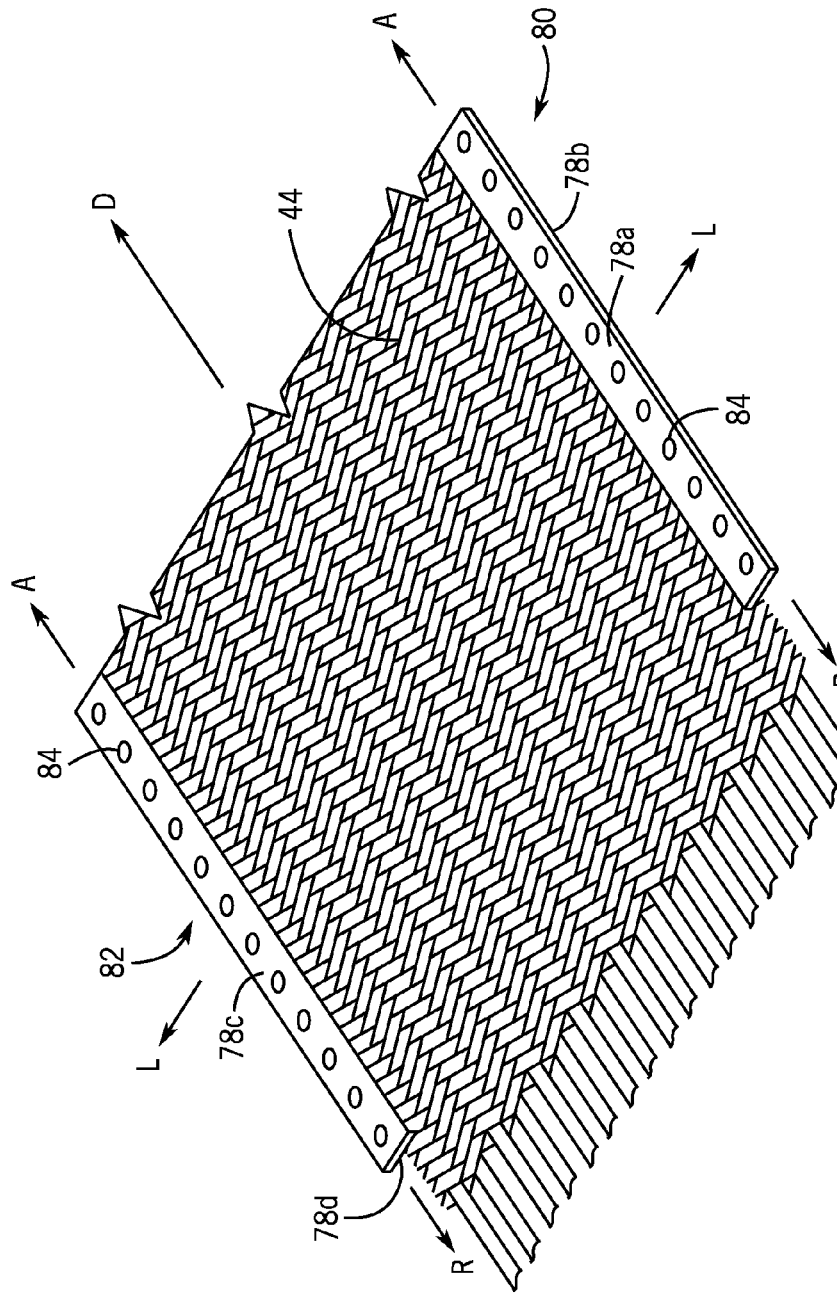
FIG. 11 illustrates the fabric with edge strips for directing the bias tows in the fabric.
Figure 12:
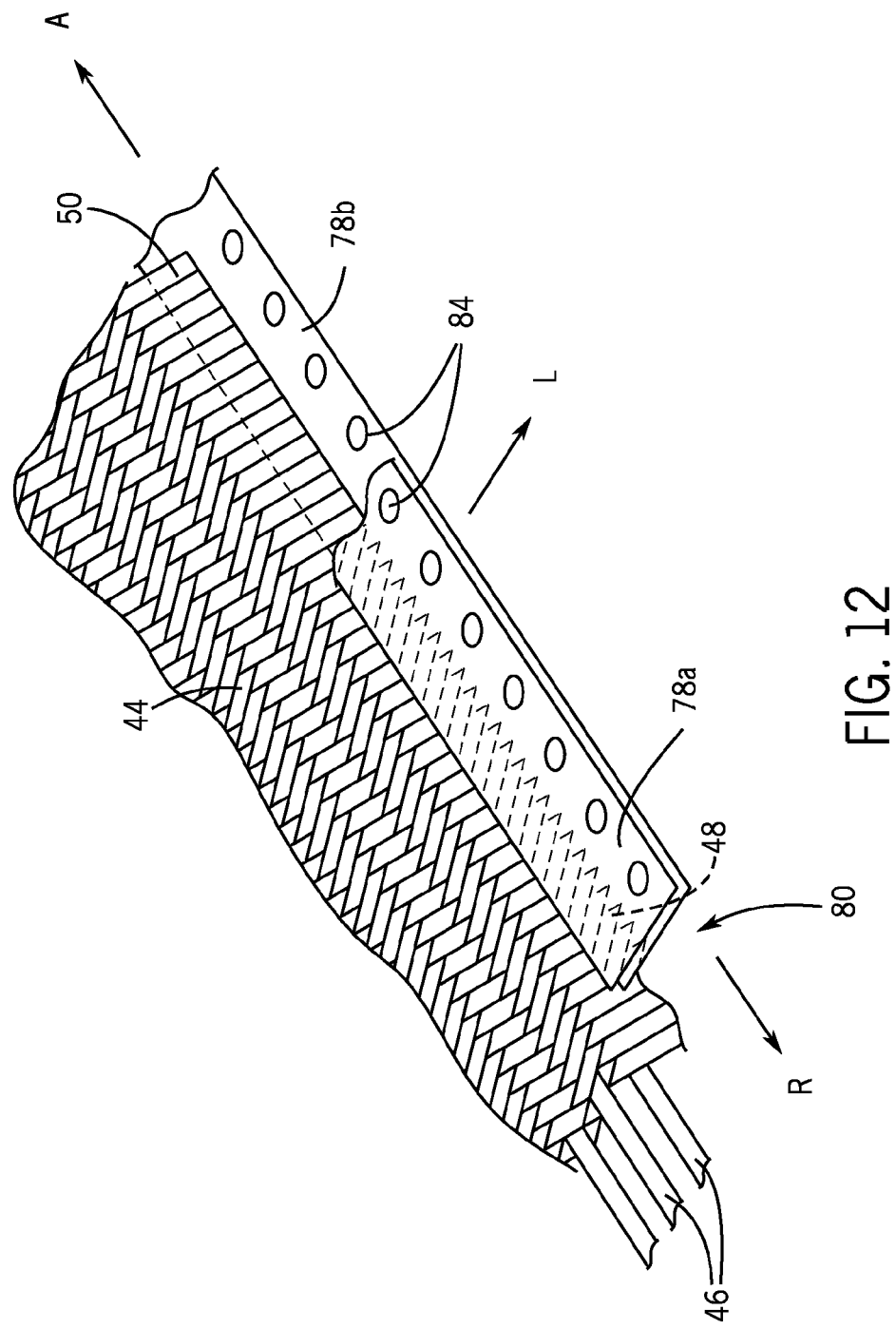
FIG. 12 is a detailed view of the edge strips attached to the fabric as in FIG. 11 that provides further detail about the attachment of the edge strips to the bi-axial tows.

Referring now to FIGS. 11 and 12, edge strips 78a, 78b, 78c, and 78d are shown which can be attached to ends of the bi-axial tows 48 and 50 of the fabric 44. When attached to the ends of the bi-axial tows 48 and 50, these edge strips 78a, 78b, 78c, and 78d can be moved to better control shear angles within the fabric and to steer the various tows. This represents yet another mode of manipulating the fabric 44 before and during wrapping of the fabric preform 20 to control the fiber structure.

Each of the edge strips 78a, 78b, 78c, and 78d are attached to ends of one of the sets of bi-axial tows 48 or 50 on one of the lateral edges 80 and 82 of the fabric 44. The lateral edges 80 and 82 are "lateral" relative to the feed direction (depicted by arrow D in FIG. 11) of the fabric 44 onto the form 54, which is generally perpendicular to its rotation axis C-C. In the form illustrated, edge strip 78a is attached to the ends of the first set of bi-axial tows 48 and edge strip 78b is attached to the ends of the second set of bi-axial tows 50 on the lateral edge 80 of the fabric 44 as can be seen in FIG. 12. On the other lateral edge 82 of the fabric 44 (which is opposite the first lateral edge 80), the edge strip 76c is attached to the other ends of the first set of bi-axial tows 48 and the edge strip 76d is attached to the other ends of the second set of bi-axial tows 50.

Edge strips 78a, 78b, 78c, and 78d could be attached to the ends of the respective set of tows in any of a number of ways. For example, the edge strips 78a, 78b, 78c, and 78d may be adhered to the tows. In another example, the edge strips 78a, 78b, 78c, and 78d may each include multiple components that clamp together under an applied force to grasp the ends of the tows.

In the embodiment illustrated, the edge strips 78a, 78b, 78c, and 78d each have a row of openings 84 formed therein that can be, for example, engaged by a line of hooks to selectively and independently move the edge strips 78a, 78b, 78c, and 78d. Such hooks might be used to move the edge strips 78a, 78b, 78c, and 78d forward or backward relative to the fabric 44 (i.e., parallel or anti-parallel to the direction of arrow D, respectively) and/or laterally outward with respect to the fabric 44 (i.e., perpendicular to the direction of arrow D in the plane of the fabric 44). Other or alternative means of engagement of the edge strips 78a, 78b, 78c, and 78d might also be used, such as, but not limited to, sprockets.

These edge strips 78a, 78b, 78c, and 78d can be controlled independently of one another. Because they are attached to two sets of bias tows (which are, in the form illustrated, the first and second sets of bi-axial tows 48 and 50), the first set of bias tows can be controlled independently of the second set of bias tows by the four edge strips 78a, 78b, 78c, and 78d. By moving one or more of the edge strips 78a, 78b, 78c, and 78d, the attached set of bi-axial tows 48 and 50 can be directed before and/or during wrapping of the fabric 44 around the form 54 to create the fabric preform 20. This directing of the bi-axial tows 48 and 50 might be used to steer tows for performance purposes or to otherwise induce shear or stress in the fabric 44 in a manner that is beneficial during the formation of the fabric preform 20 and the resultant composite component.

It should be appreciated that in order to fully steer a bi-axial tow as it is wrapped onto a form, it may be desirable to maintain the force on the edge strips until the entire tow is placed on the form. Accordingly, it may be the case that the end of a bi-axial tow that is first received on the form may be held until the second end is also received on the form. Because the bi-axial or bias tows are at an angle relative to the feed direction of the fabric, this may mean that the tows need to be held for some distance after they are received on the form.

A number of examples of movements of the edge strips 78a, 78b, 78c, and 78d are now described to highlight potential ways in which the fabric 44 might be manipulated. The examples are intended to be illustrative, but not the only examples of how the edge strips 78a, 78b, 78c, and 78d might be employed.

To induce stress or shear in the fabric 44, one or more of the edge strips 78a, 78b, 78c, and 78d might be advanced or retarded relative to the fabric 44 to control the orientation of the respectively attached set of tows and to change the angle between the first set of bias tows and the second set of bias tows. For example, the edge strip 78a could be advanced relative to the feed direction D of the fabric 44 along a direction indicated by arrow A and the edge strip 78c retarded relative to the feed direction D of the fabric 44 along a direction indicated by arrow R to sharpen the angle between the axial tows 46 and the first set of bi-axial tows 48. This might result in shift in this set of bi-axial tows 48 from −60 degrees to −50 degrees, for example. Simultaneously, the edge strip 78b might be retarded relative to the feed direction D of the fabric 44 and the edge strip 78d might be advanced relative to the feed direction D of the fabric 44 to sharpen the angle between the axial tows 46 and the second set of bi-axial tows 50. Again, this might be a change from +60 degrees to +50 degrees. This has the effect of narrowing the fabric 44 and scissoring the bi-axial tows 48 and 50 to reduce the lateral spacing between the axial tows 46. This may result in differential spacing of the axial tows 46 depending on the shape of the form 54 and the amount of localized shear induced in the fabric 44.

Alternatively, each of the edge strips 78a, 78b, 78c, and 78d could be moved in the opposite direction (i.e., advanced rather than retarded and vise-versa), to cause the bi-axial tows 48 and 50 to have angles that become larger with respect to the axial tows 46. This results in the fabric 44 effectively becoming wider under the applied movement of the edge strips 78a, 78b, 78c, and 78d.

In another example, the edge strips 78a, 78b, 78c, and 78d may be pulled laterally outwardly along a direction indicated by arrows L to maintain tautness over the width of the fabric 44. This could be done with or separately from advancing or retarding the edge strips 78a, 78b, 78c, and 78d.

It is contemplated that each of the edge strips 78a, 78b, 78c, and 78d could have a force applied thereto with a direction of applied force anywhere along an arc of 180 degrees in the plane of the fabric 44 from a pure advance direction A to a pure reverse direction R and that passes through the laterally outward direction L. Essentially, this means that a force having a combination of the (A or R) and/or L directions could be applied to each of the edge strips 78a, 78b, 78c, and 78d. This force or these forces could be applied as separately discrete vectors in the (A or R) and/or L directions or as a single combined vector depending on the apparatus that applies the force to the edge strips 78a, 78b, 78c, and 78d.

Ultimately, this means each of the edges strips 78a, 78b, 78c, and 78d can be independently moved or held stationary relative to the direction and rate of fabric feed D to provide many modes of fabric manipulation. As noted above, each of the four edge strips 78a, 78b, 78c, and 78d could be advanced, retarded, held stationary and/or moved laterally outward relative to fabric feed direction D. Moreover, the fore/aft movement for each of the edge strips 78a, 78b, 78c, and 78d could be combined with a laterally outward force such as that each of the edge strips 78a, 78b, 78c, and 78d could be pulled in any direction within 180 degrees in the plane of fabric. As all four edge strips 78a, 78b, 78c, and 78d can be separately controlled this results in many combinations of potentially applied forces.

Although four edge strips 78a, 78b, 78c, and 78d are illustrated, it is contemplated that fewer than four edge strips 78a, 78b, 78c, and 78d might be used to steer or guide the tows. For example, a single edge strip might be used to guide or steer one end of a single set of tows. In another example, a pair of edge strips might be attached to only a single lateral edge of the fabric such that each of the edge strips are attached to one of the set of edges of each of the sets of the bias fibers. Then by advancing one and retarding the other of the edge strips, a localized shear can be induced in that side of the fabric.

This localized deformation of fabric can be exploited during wrapping of complex shapes. For example, if a joggle or some other feature is present on the form 54, then the bias fibers can be controlled or directed to be better contoured to the surface (e.g., have fewer wrinkles, lay flatter on the form, etc.). This may be done, by example, by the selective inducement of shear to facilitate formation of a feature on the fabric preform 20.

Moreover, by application of some amount of tension or force to the bias or bi-axial tows as the fabric 44 is laid down on the form 54, this fabric shaping or contouring can be preserved or locked into the fabric 44 in the fabric preform 20. This means that the fabric 44 can be coaxed into shapes and contours that would be difficult, if not impossible, to obtain using conventional wrapping techniques and then frozen into that configuration by further wrapping, which initially holds the underlying fibers in the stressed condition and, ultimately, the application of resin. Unless this shaping of the fabric is captured on the form during wrapping, the fabric will tend to flex back toward its original relatively generally planar state as the stress is naturally worked out of the fabric.

It should be appreciated that some consideration needs to be made to balancing the strength of the various applied forces to the fabric. The forces applied to the bias or bi-axial tows must be sufficiently great to overcome the forces used to keep the fabric taut in the feed or machine direction. If the forces applied to the bias or bi-axial tows of the fabric are too small, then it is possible that the strength of the forces used to keep the fabric taut will overcome them and neutralize their effect.

Accordingly, using this method, fabric preforms and composite components can be formed having heretofore unseen tow architecture in the as-laid fabrics.

In some embodiments, the fabric preform includes a first volume in which the first and second set of bias or bi-axial tows are disposed at a first angle relative to one another and a second volume in which the first and second set of bias or bi-axial tows are disposed at a second angle relative to one another in which the first angle is different than the second angle. This means the fabric may be selectively stretched over certain regions of the form to meet a selected geometry.

In other embodiments, the bias or bi-axial tows are under an induced stress by alteration of their orientation in comparison to a relaxed fabric and the induced stress is locked into the fabric preform during wrapping to maintain the orientation of the bias or bi-axial tows. This may result in induced stress or shear in the fabric of the preform, although this induced stress or shear could be uniform throughout the preform.

In some embodiments, features can be formed on the fabric preform that extend, at least in part, in a radial direction relative to a central axis of the fabric preform such as a joggle or change in diameter.

As noted above, any of the as-laid tow architectures could be locked into place by applying a resin to the fabric preform and curing it to form the composite component.

It should be appreciated that this edge manipulation of fabric might be practiced with any type of fabric having at least two sets of bias fibers. For example, it might be practiced with bias woven fabrics, bi-axial fabrics, and tri-axial fabrics. If the fabric is a tri-axial fabric 42 as described herein, then one of the two sets of bi-axial tows 48 can constitute the first set of bias tows and the other of the two sets of bi-axial tows 50 can constitute the second set of bias tows. In one preferred embodiment, the tows comprise the carbon fibers, which are commonly used in aircraft composite components.

A third method of manipulating the fabric to facilitate the formation of fabric preforms and their resultant composite components is now described. According to this third method, the fabric 44 wrapped around the form 54 has hoop tows 46 and these hoop tows 46 are capable of being separated into segments to permit improved flexure of the fabric 44. This improved flexure as a result of hoop tow segment separation assists in forming features which require particularly high amounts of deformation or elongation (e.g., flange formation).

According to the general method, one end of the fabric 44 is received on the form 54 such that the hoop tows 46 of the fabric 44 extend in a direction generally perpendicular to a central axis C-C of the form 54 such as was generally depicted in FIG. 9. The fabric 44 is then wrapped around the form 54 by rotating the fabric 44 and the form 54 relative to one another about the central axis C-C of the form 54. Either during wrapping or after wrapping, at least some of the hoop tows 46 are separated into hoop tow segments while the fabric 44 is under tension, stress, or shear. This separation enables spaces to form between the ends of adjacent hoop tow segments along the length of the hoop tow 46.

Advantageously, by separating at least some of the hoop tows into hoop tow segments to enable spaces to develop between adjacent hoop tow segments, increased deformation of the fabric is accommodated during formation of the fabric preform. Moreover, this accommodation occurs while still maintaining a presence of hoop tow segments in at least portions of the fabric for strength.

Historically, in order to form features that require high levels of fabric deformation such as, for example, flanges 22, the hoop tows 46 would be eliminated from the sections of the fabric 44 that would be formed into that feature. This is because the hoop tows 46 would typically inhibit the formation of a radially-extending feature such as a flange 22 to be formed, as the act of bending the precursor flange regions 40 into flanges 22 would be greatly resisted by the hoop tows 46 in the initial fabric preform 20. However, the elimination of the hoop tows 46 left certain regions of the fabric preform 20 with only bi-axial tows 48 and 50 and made these regions comparably weaker to the rest of the part.

It has been found desirable to modify the fabric 44 so as to permit the hoop tows 46 to selectively separate under tensions, stresses, or shear, so that hoop tows 46 can be maintained in regions of the composite component such as flanges without impairing the ability of the feature to be formed in the first instance.

The hoop tows 46 may be made separable by preparing the fabric 44 prior to wrapping. In some embodiments, at least some of the hoop tows 46 are stretch broken at periodic intervals to define the hoop tow segments. In other embodiments, the hoop tows 46 might be cut at periodic intervals to define the hoop tow segments.

Figure 13:
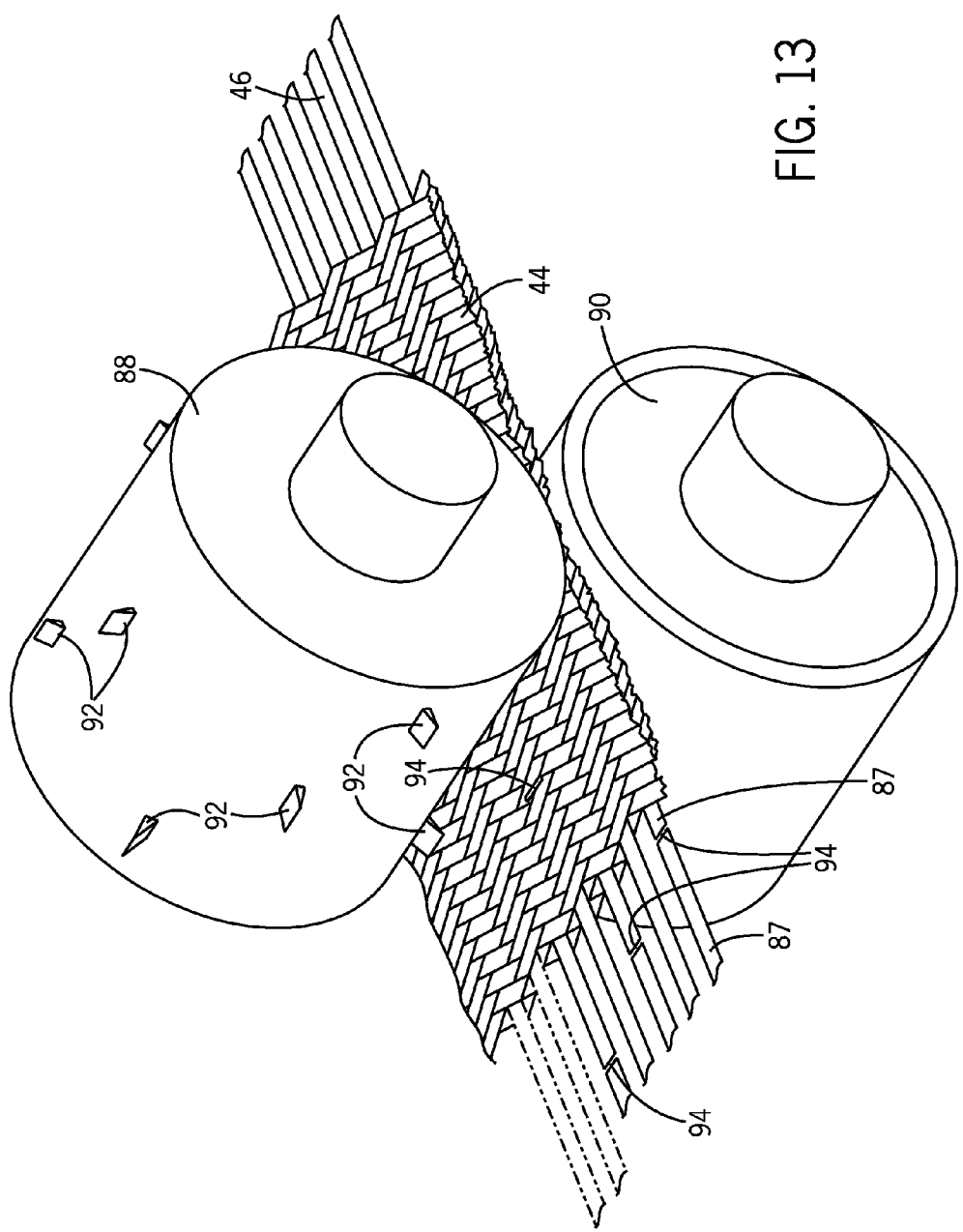
FIG. 13 is an apparatus for periodically cutting or severing the axial tows.

Looking now at FIG. 13, an apparatus 86 is shown for cutting the hoop tows 46 at periodic intervals into hoop tow segments 87. This apparatus 86 includes a pair of rolling drums 88 and 90 between which the fabric 44 can be fed. One of the pair of rolling drums 88 has radially-extending blades or punches 92 that can be used to selectively cut the hoop tows 46. Although not shown, the rolling drum 90 may have corresponding slots into which the punches 92 of the rolling drum 88 are received (so as to ensure a complete cut) or the rolling drums 88 and 90 may be spaced sufficiently that there is inter-roller clearance between the rolling drums 88 and 90 through which the blades 92 can pass. Although not illustrated, it is contemplated the bias fibers or bi-axial tows 48 and 50 could be separated to provide access to the hoop tow 46 before the hoop tow 46 is cut so as to minimize the damage to the bi-axial tows 48 and 50.

By spacing the punches 92 over the axial length of the rolling drum 88 and over the circumference of the rolling drum 88, the spacing of the cuts 94 of the hoop tows 46 in the fabric 44 can be selected to be at periodic intervals. Based on the illustrated spacing of the punches 92 on the rolling drum 90, points of separation in the hoop tows are out of phase from those in adjacent hoop tows along the direction of hoop tow extension. This periodic spacing of the cuts 94 can be beneficial because, once spaces or gaps develop during forming of the fabric 44, a separation gap between two hoop tow segments in one hoop tow can be supported by a hoop tow segment in an adjacent hoop tow.

Figure 14:
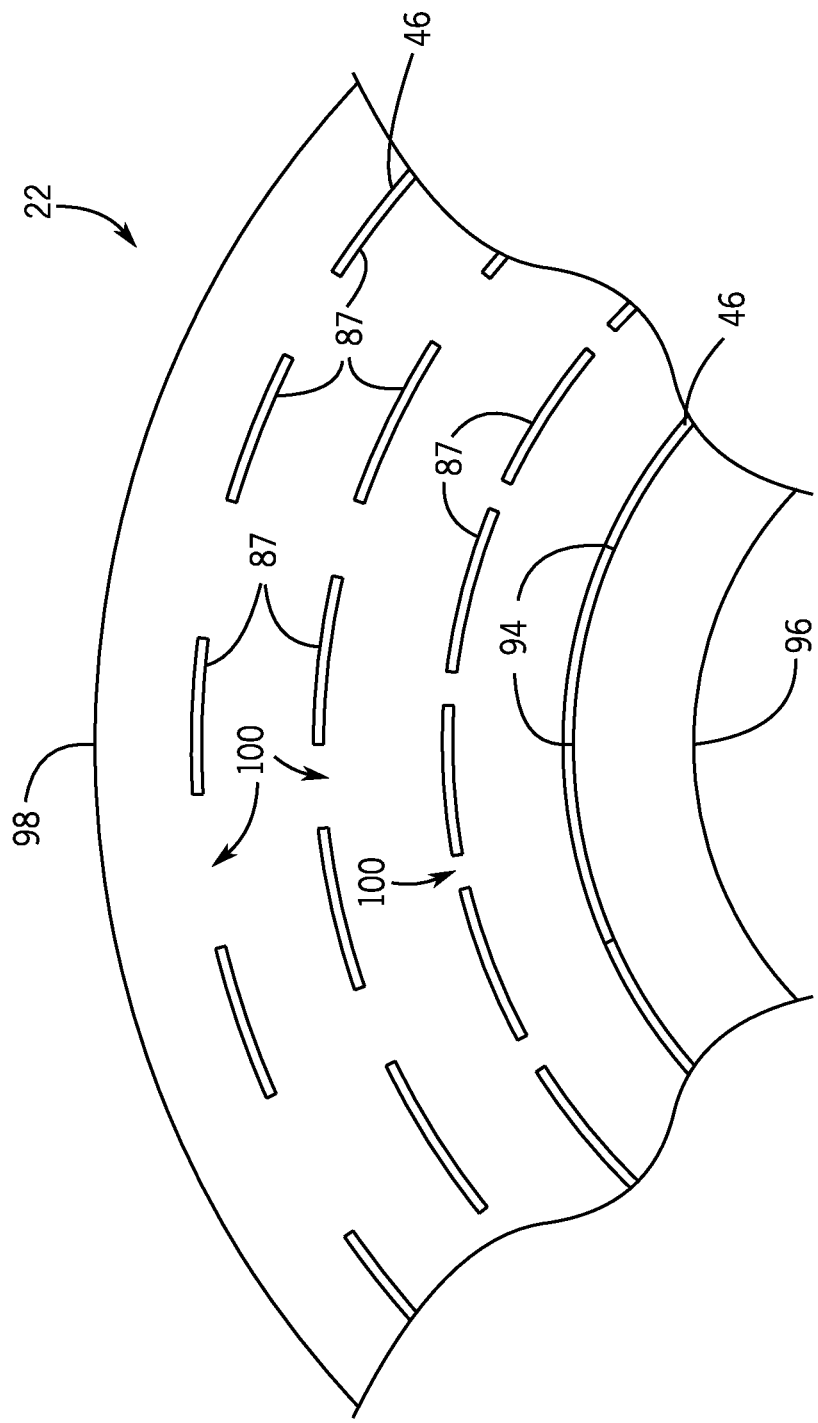
FIG. 14 is a side view of a portion of a flange that illustrates the placement and spacing of some of the hoop tow segments.

For example and with additional reference to FIG. 14, a side-on view of a flange 22 after it is bent up is provided in which the hoop tows 46 are schematically illustrated (although the bi-axial tows are absent for the sake of clarity). As can be seen, in portions of the flange 22 that are subjected to shear, some of the hoop tows 46 are separated into hoop tow segments 87 such that spaces develop between the ends of adjacent hoop tow segments along the length of the hoop tows 46. Under locally applied tension or pulling, each of the hoop tows 46 can break and/or separate at the points of separation to relieve the tension.

The spacing between the hoop tow segments 87 can vary throughout the preform 20 (or resultant component 18). For example, near the inner circumference 96 of the flange 22, the hoop tows 46 have cuts 94 but are minimally, if at all, separated. However, near the outer circumference 98, the required deformation of the fabric 44 during forming demands that the hoop tows 46 expand into hoop tow segments 87 with gaps or spaces 100 between the hoop tow segments 87. As can be seen, these spaces 100 between the hoop tow segments 87 are greater in areas of the flange 22 where the fabric 44 is exposed to increased diametrical dimension. Moreover, because the cuts 94 are out of phase with one another, lines of gaps or spaces are avoided, which prevents lines of weakness in the final composite component.

To ensure that the gaps 100 are sufficiently covered and that the hoop tow segments 87 are retained in the fabric 44, the hoop tow segments 87 may be selected to be at least some minimal length based on the width or diameter of the tow. For example, in one embodiment, the length of the hoop tow segments 87 are not less than 10 times the width of a hoop tow.

The amount of separation or the space of the gaps 100 between the hoop tow segments 87 can be substantial and non-trivial. For example, the gaps 100 between the hoop tow segments 87 could be at least as long as the fabric tows are wide. In still another example, the overall length of a hoop tow, including the gaps 100 formed after the hoop tow segments 87 are separated, could exceed the maximum length of the same hoop tow under elastic deformation due to an applied tension without the provided points of separation in the hoop tow.

Moreover, it should be observed that in preparation of fabric 44, only certain regions of the fabric 44 could be prepared to have separable hoop tows 46. For example, in the example of fabric preform 20 for the fan containment case 18, only the precursor flange regions 40 and/or the joggle 34 might be prepared to have separable hoop tows, because these are the only regions that will require heightened levels of fabric deformation and stretching to be formed. The generally cylindrical portions of the body may have standard non-separable hoop tows 46 to maximize the structural strength of these regions.

It is contemplated that in fabrics with separable hoop tows, certain features might be formable during wrapping that conventionally have been difficult to produce. For example, by guiding a fabric with selectively separable hoop tows (and perhaps by further moving the bi-axial tows 48 and 50 using the edge strip technique described above) that a flange 22 could be formed in the as-laid preform rather than requiring secondary bending of the preform to obtain this feature.

It is also contemplated that the fabric structure could be modified to limit the relative placement of the hoop tow segments 87 in adjacent hoop tows. For example, a lateral connecting thread could be separately linked to various adjacent hoop tow segments 87 to keep them together. If the connection of the thread to the hoop tow segments 87 is greater than the force required to separate the hoop tow segments 87 in a particular hoop tow from one another, this lateral connecting thread could generally limit the placement and spacing of the hoop tow segments 87 from one another. This could be used, for example, to inhibit the formation of a single large gap in a hoop tow rather than a plurality of smaller gaps. Additionally, where the points of separation are intentionally out of phase with one another, such a lateral connecting thread could be used to make sure that the gaps do not form lines of weakness.

Accordingly, a fabric preform or a composite component is provided that includes a body formed from the fabric and at least one feature formed in the body. At least some of the hoop tows in the feature (e.g., a flange in a fan containment case) are separated into hoop tow segments that are spaced from one another along the length of the hoop tow. To exploit the benefit of the expandable or separable hoop tows, the feature (which includes the hoop tows) may extend, at least in part in a radial direction away from the central axis of the body. Again, some of the hoop tows in the base fabric may be separable while others may not be to maximize the strength of the structure.

Finally, a method of continuously debulking the fabric preform could be employed, either separately from the fabric manipulation techniques described herein or in conjunction with one or more of the fabric manipulation techniques.

Figure 15:
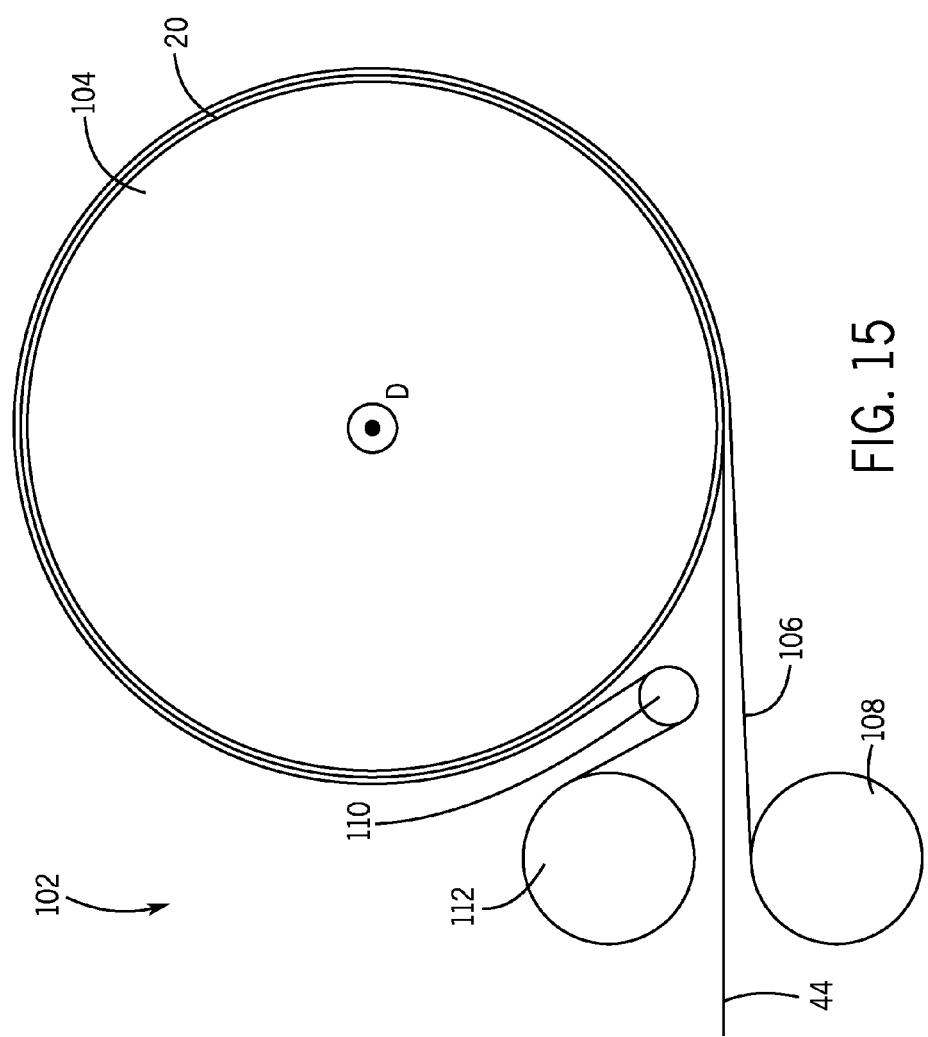
FIG. 15 is a side view of an apparatus that enables the continuous application of pressure during wrapping of the fabric preform by drawing a film against the preform using a vacuum.
Figure 16:
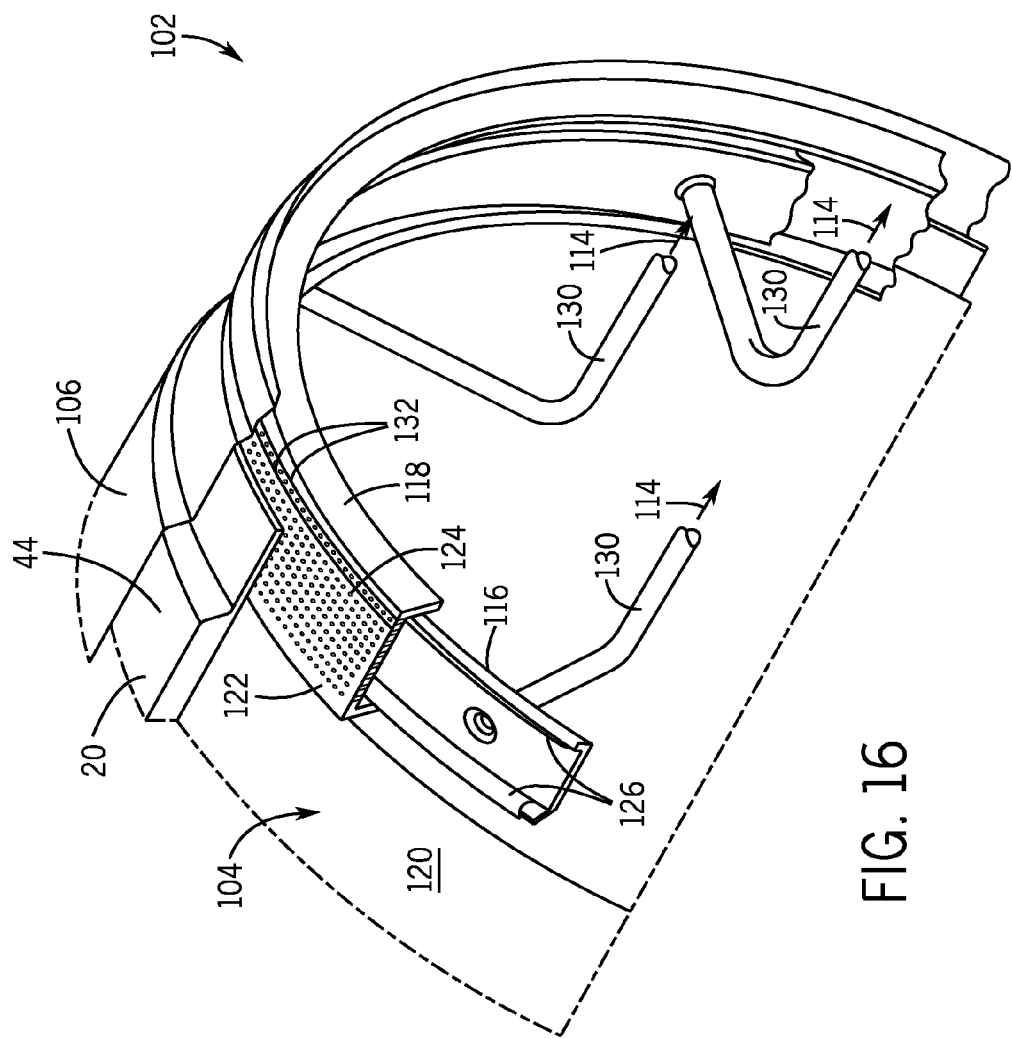
FIG. 16 is a partial perspective view of the apparatus of FIG. 15 in which the various elements of the apparatus in the form are illustrated in greater detail.
Figure 17:
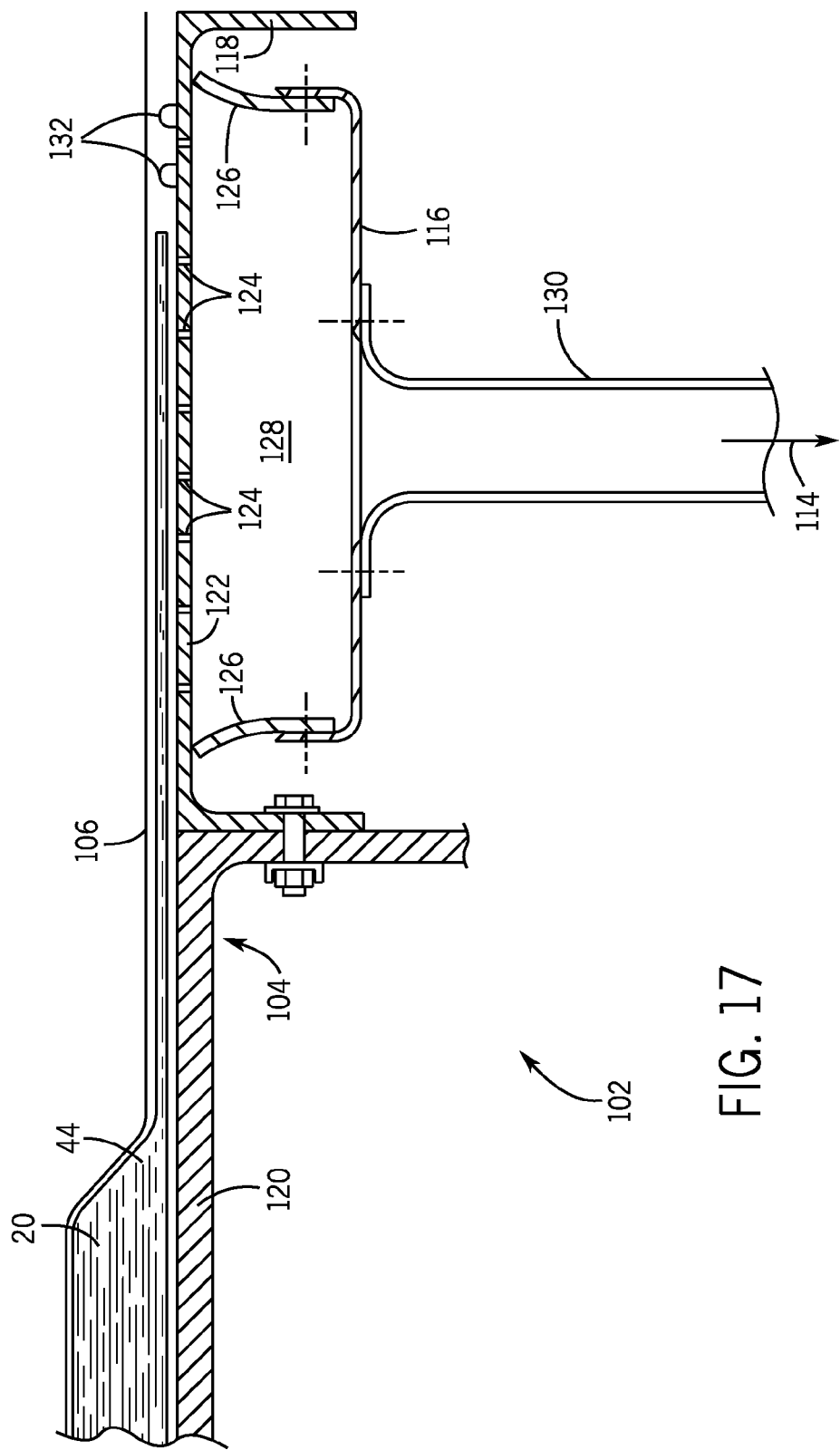
FIG. 17 is a cross-sectional view of the apparatus of FIG. 15 in which there is a sliding seal between a rotating portion of the form and a fixed portion connected to a vacuum.

Referring now to FIGS. 15 through 17, an apparatus 102 for continuously debulking a fabric preform is illustrated. This apparatus applies a compaction pressure to a portion of the top layer of the fabric as it is being laid down.

Looking first at the simplified schematic of FIG. 15, the apparatus 102 includes a form 104 rotatable about a central axis D-D for receiving a fabric 44 for the fabric preform 20. In some respects, this form 104 is similar to other forms in that the fabric 44 is pulled onto the form for wrapping the fabric preform 20.

However, the apparatus 102 is different than a traditional wrapping apparatus in that it is also configured to concurrently run a film 106 around at least a part of the form 104. The film 106 is fed off of a film supply spool 108 and has a film path that extends to the form 104, around at least a portion of the form 104 (which as illustrated is approximately 300 degrees), around an intermediate roller 110, and onto a film take-up spool 112 that is spaced from the form 104. This film 106 is disposed radially outward of the form 104 such that the fabric 44 of the fabric preform 20 is captured between the film 106 and the form 104. Because the film 106 extends around only a portion of the form 104 before the film 106 is routed onto the take-up spool 112, the film 106 is not made part of the fabric preform 20, but rather surrounds a portion of the fabric preform 20.

The film 106 and the fabric 44 may be fed onto the form 104 together such that the film 106 is disposed outward of the fabric 44 relative to the form. In this way, it might be said that the film 106 serves as a backing sheet that carries the fabric 44 as it is initially wrapped onto the form 104.

Now with additional reference to FIGS. 16 and 17, further details of the apparatus 102 are illustrated. Specifically, a structure is illustrated for drawing a vacuum between the form 104 and the film 106 such that the fabric 44 is compressed there between.

It should be noted that in order to draw a vacuum, seals should be formed at the lateral or axial ends of the form 104 between the form 104 and the film. In the embodiment shown, because the form 104 is generally cylindrical, the seals extend over an arc.

The other spots that need to be "sealed" are the lines transverse to the fabric feed path at (1) the point at which the fed fabric initially contacts the form 104 (or the fabric 44 already wrapped around the form) and (2) the point at which the film 106 separates from the outer periphery of the form. By keeping the film 106 and the fabric 44 taut, these lines can form a pseudo-seal through which little gas can pass.

A vacuum source (depicted by arrows 114) is used to draw a vacuum between the film 106 and the form 104. This vacuum causes the film 106 to be pulled toward the form 104, thereby applying a compaction pressure to the outwardly facing surface of the fabric being wrapped into the fabric preform 20.

In the particular embodiment of the apparatus 102 shown, the vacuum is drawn through a portion of the form 104. As best seen in FIGS. 16 and 17, the form 104 includes a fixed portion 116 and a rotating or rotatable portion 118 which are both generally annular because of shape of the form 104. As illustrated, the rotating portion 118 includes a central section 120 with lateral sections 122 fixedly connected at the ends thereof. The outwardly facing portions of the central section 120 and the lateral sections 122 generally define the surface of the form 104 that the fabric 44 is wrapped around.

In cross section, the lateral sections 122 are generally upside-down U-shaped channels. These lateral sections 122 include a plurality of openings 124 that extend from the outwardly-facing side of the section 112 (that defines a part of the form 104) to an inwardly-facing side on the inside of the "U".

In cross section, the fixed portions 116 are a generally U-shaped channel that is roughly received in the upside-down shaped "U". A pair of annular seals 126 is fixed to one of the fixed portion 116 and the rotating portion 118 for forming an annular shaped vacuum chamber 128 there between. In the particular form illustrated, the seals 126 are connected to the fixed portion 116 and are pressed against the inwardly-facing surface of the rotating portion 118.

A series of vacuum lines 130 are connected to the fixed portion 116 and are in communication with the vacuum chamber 128. Through these vacuum lines 130, it is possible to draw a vacuum in the vacuum chamber 128 using the vacuum source 114. Because the openings 124 are in communication with the vacuum chamber 128, a vacuum drawn in the vacuum chamber 128 is communicated to the area between the film 106 and the form 104. When sufficient seals are provided on the lateral edges of the form 104 and the lines transverse to the fabric feed path, this vacuum causes the film 106 to be drawn down such that the film applies a compaction pressure to the partially-wrapped fabric preform 20.

In the form illustrated, the lateral seals are formed by placing a pair of raised gaskets 132 axially outward of the portion of the form 104 around which the fabric 44 is wrapped. Some openings 124 are placed between the gaskets 132 to place the space between the gaskets 132 in communication with the vacuum chamber 128. When a vacuum is drawn, the film 106 is sucked down onto the gaskets 132 and a lateral seal is formed.

Accordingly, using an apparatus 102 of the type described above, a compaction pressure can be continuously applied to a fabric during formation of a fabric preform. Initially one end of the fabric 44 is applied to the form 104. The form 104 with the fabric 44 applied thereto is at least partially surrounded by the film 106 in which the film 106 extends along a film path from the film supply spool 108 to the form 104 and around at least a portion of the form 104. The fabric 44 and the film 106 is fed onto the form 104 such that the fabric 44 is wrapped around the form 104 to form the fabric preform 20 while the film 106 is fed around the form 104 (although not made part of the preform 20). During this feeding a vacuum is drawn to evacuate a gas from between the form 104 and the film 106, thereby pressing the film 106 onto the fabric 44 and applying the compaction pressure to the fabric 44.

This compaction pressure could be applied simultaneously with wrapping and may be constant. It is contemplated, however, that alternatively variable and/or periodic pressures could be applied using the apparatus 102. The compaction pressure applied by the film 106 to the fabric 104 can be approximately 12 psi; however, different compact pressures might be applied based on the mechanical properties of the fabric 44, the geometry of the form 104, the forces applied to the fabric 44 during wrapping, and so forth.

Again, the film 106 can surround a substantial portion, but not all of the fabric 44 wrapped around the form 104. This means that the compaction pressure is applied to the fabric over less than one full rotation of the form 104. It is contemplated 75 percent or more of the surface area of the topmost fabric layer may be compressed against the form by the film 106. Accordingly, in contrast to typical debulking methods, only a portion of the fabric preform is debulked at a given time, and that particular portion is constantly changing during the rotation of the form 104.

In some forms of the method, the intermediate roller 110 routes and redirects the film 106 from around at least a portion of the form 104 to the take-up spool 112. This intermediate roller 110 can have an axis that is parallel with, but spaced from, the central axis D-D of the form 104 and, moreover, can be biased into contact with the form 104 to assist in forming a good seal.

Using this method a fabric preform for a composite component, such as a fan containment case or fan case may be formed. The resultant fabric preform would be substantially free of bulk and wrinkles as the fabric is continuously debulked during wrapping. Accordingly, this technique provides a fiber architecture in the underlying fabric that is superior to conventional wrapping techniques.

This method might also be used to debulk prepreg or non-prepreg fabrics. Prepreg fabrics are those which contain some amount of resin in the fabric as supplied and can therefore be said to be pre-impregnated with the resin material. However, because prepreg fabrics are solid and not very permeable to gas in comparison to non-prepreg fabrics, it is contemplated that the film 106 could be textured to transfer the vacuum over the axial length of the form 104 between the bottom surface of film 106 and the upper surface of the topmost prepreg fabric layer.

It should again be stressed that this debulking technique might be combined with the other fabric manipulation techniques to synergistically result in fabric preforms for ultra-high strength composite components. For example, the debulking technique could be combined with the separate axial tensioning method to result in a preform having extremely high fiber volume ratio.

It should be appreciated that various other modifications and variations to the preferred embodiments can be made within the spirit and scope of the invention. Therefore, the invention should not be limited to the described embodiments. To ascertain the full scope of the invention, the following claims should be referenced.

What is claimed is:

1. A method of directing bias tows of a fabric to be wrapped around a form to create a fabric preform, the fabric including at least a first set of bias tows that are generally parallel with one another and a second set of bias tows that are generally parallel with one another but that are not parallel with the first set of bias tows, the method comprising:
    attaching an edge strip to ends of the first set of bias tows at a first lateral edge of the fabric relative to a feed direction of the fabric onto the form;
    moving the edge strip to direct the first set of bias tows; and
    wrapping the fabric around the form by rotating the fabric and form relative to one another about the central axis of the form to create the fabric preform;
    wherein, by moving the edge strip to direct the first set of bias tows, a shear is induced in the fabric so as to facilitate formation of a feature on the fabric preform, and wherein the step of moving the edge strip is separate from the step of wrapping the fabric.

2. The method of claim 1 further comprising:
    attaching an edge strip to ends of the first set of bias tows at a second lateral edge of the fabric, the second lateral edge being opposite the first lateral edge; and
    moving both of the edge strips attached to the ends of the first set of bias tows to direct the first set of bias tows.

3. The method of claim 2 wherein the edge strip attached to the ends of the first set of bias tows on the first lateral edge is advanced relative to the feed direction of the fabric and the edge strip attached to the ends of the first set of bias tows on the second lateral edge of the fabric is retarded relative to the feed direction of the fabric.

4. The method of claim 1 further comprising:
    attaching an edge strip to ends of the second set of bias tows at the first lateral edge of the fabric; and
    moving the edge strip attached to ends of the second set of bias tows to direct the second set of bias tows.

5. The method of claim 4, wherein the edge strip attached to the ends of the first set of bias tows on the first lateral edge is advanced relative to the feed direction of the fabric and the edge strip attached to the ends of the second set of bias tows on the first lateral edge of the fabric is retarded relative to the feed direction of the fabric.

6. The method of claim 1 wherein four edge strips are attached to ends of the first set of bias tows on the first and second lateral edges of the fabric and to the ends of the second set of bias tows on the first and second lateral edges of the fabric, respectively.

7. The method of claim 6 wherein the four edge strips are controlled independently of one another and the first set of bias tows are controlled independently of the second set of bias tows by the four edge strips.

8. The method of claim 6 wherein one of the edge strips attached to each of the first set of bias tows and the second set of bias tows are advanced relative to the feed direction of the fabric while the other of the edge strips attached to each of the first set of bias tows and the second set of bias tows are retarded relative to the feed direction of the fabric to induce shear in the fabric.

9. The method of claim 8 wherein advancing and retarding the edge strips relative to the fabric controls the orientation of the respectively attached set of tows and changes the angle between the first set of bias tows and the second set of bias tows.

10. The method of claim 6 wherein at least some of the edge strips are pulled laterally outward to place the fabric in lateral tension that is generally perpendicular to a feed direction of the fabric.

11. A method of directing bias tows of a fabric to be wrapped around a form to create a fabric preform, the fabric including at least a first set of bias tows that are generally parallel with one another and a second set of bias tows that are generally parallel with one another but that are not parallel with the first set of bias tows, the method comprising:
    attaching an edge strip to ends of the first set of bias tows at a first lateral edge of the fabric relative to a feed direction of the fabric onto the form;
    moving the edge strip to direct the first set of bias tows; and
    wrapping the fabric around the form by rotating the fabric and form relative to one another about the central axis of the form to create the fabric preform;
    wherein the step of wrapping occurs contemporaneously with the step of moving the edge strip to direct the first set of bias tows, and wherein the step of moving the edge strip is separate from the step of wrapping the fabric.

12. The method of claim 1 wherein the fabric preform has a central axis and the feature formed on the fabric preform extends, at least in part, in a radial direction relative to the central axis of the fabric preform.

13. The method of claim 1 wherein a tension is applied to at least some of the bias tows that induces a stress in the fabric.

14. The method of claim 1 wherein the fabric is pulled onto the form along a feed direction that is generally perpendicular to a rotational axis of the form.

15. The method of claim 1 wherein the fabric is a tri-axial fabric comprising a plurality of axial tows and two sets of bi-axial tows, wherein one of the two sets of bi-axial tows are the first set of bias tows and the other of the two sets of bi-axial tows are the second set of bias tows.

16. The method of claim 1 wherein the fabric is a biaxial fabric comprising the first set of bias tows and the second set of bias tows.

17. A method of directing bias tows of a fabric to be wrapped around a form to create a fabric preform, the fabric including at least a first set of bias tows that are generally parallel with one another and a second set of bias tows that are generally parallel with one another but that are not parallel with the first set of bias tows, the method comprising:
    attaching an edge strip to ends of the first set of bias tows at a first lateral edge of the fabric relative to a feed direction of the fabric onto the form;
    moving the edge strip to direct the first set of bias tows; and wrapping the fabric around the form by rotating the fabric and form relative to one another about the central axis of the form to create the fabric preform;

wherein the bias fabric is a bias woven fabric, and wherein the step of moving the edge strip is separate from the step of wrapping the fabric.

18. The method of claim 1 wherein, by directing the bias tows, at least some of the tows are steered for performance purposes.

19. The method of claim 1 wherein the tows of the fabric comprise a carbon-fiber material.

20. The method of claim 1 wherein the fabric used to form the fabric preform is a tri-axial fabric and, by directing the bias tows to induce some amount of fabric shear, differential spacing of axial tows is induced.

* * * * *

UNITED STATES PATENT AND TRADEMARK OFFICE
CERTIFICATE OF CORRECTION

| | |
|---|---|
| PATENT NO. | : 8,900,392 B2 |
| APPLICATION NO. | : 13/333619 |
| DATED | : December 2, 2014 |
| INVENTOR(S) | : Steven Robert Hayse |

It is certified that error appears in the above-identified patent and that said Letters Patent is hereby corrected as shown below:

In the Claims

Column 19, claim 17, line 4, replace, "wherein the bias fabric is a bias woven fabric," with --wherein the fabric is a bias woven fabric,--.

Signed and Sealed this
Twenty-first Day of April, 2015

Michelle K. Lee
*Director of the United States Patent and Trademark Office*